US012380445B1

(12) United States Patent
Khmelev et al.

(10) Patent No.: US 12,380,445 B1
(45) Date of Patent: Aug. 5, 2025

(54) SYSTEM AND METHOD FOR DIGITAL PAYMENTS USING BLOCKCHAIN WITH MERCHANT KEYS

(71) Applicant: UIPCO, LLC, San Antonio, TX (US)

(72) Inventors: Yevgeniy Viatcheslavovich Khmelev, San Antonio, TX (US); Gregory Brian Meyer, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 400 days.

(21) Appl. No.: 17/843,049

(22) Filed: Jun. 17, 2022

Related U.S. Application Data

(60) Provisional application No. 63/212,739, filed on Jun. 21, 2021.

(51) Int. Cl.
*G06Q 20/38* (2012.01)
*G06Q 20/20* (2012.01)
*G06Q 20/40* (2012.01)

(52) U.S. Cl.
CPC ......... *G06Q 20/389* (2013.01); *G06Q 20/202* (2013.01); *G06Q 20/3829* (2013.01); *G06Q 20/4015* (2020.05)

(58) Field of Classification Search
CPC ............ G06Q 20/389; G06Q 20/4015; G06Q 20/202; G06Q 20/3829
See application file for complete search history.

(56) References Cited

U.S. PATENT DOCUMENTS

| | | | | |
|---|---|---|---|---|
| 11,587,071 | B2* | 2/2023 | Ravinathan | G06Q 20/3674 |
| 11,763,275 | B2* | 9/2023 | Kim | G06Q 20/20 |
| | | | | 705/39 |
| 2017/0206604 | A1* | 7/2017 | Al-Masoud | G06Q 40/08 |
| 2017/0236121 | A1* | 8/2017 | Lyons | G06Q 20/06 |
| | | | | 705/71 |
| 2018/0081787 | A1* | 3/2018 | Riddick | G06Q 20/14 |
| 2018/0204195 | A1* | 7/2018 | Kang | G06Q 20/36 |
| 2018/0276666 | A1* | 9/2018 | Haldenby | H04L 9/3268 |
| 2018/0322597 | A1* | 11/2018 | Sher | G06Q 50/163 |

(Continued)

FOREIGN PATENT DOCUMENTS

| | | |
|---|---|---|
| CN | 115375291 A | 11/2022 |
| WO | WO-2021262090 A1 | 12/2021 |

OTHER PUBLICATIONS

Non-Final Office Action mailed Feb. 16, 2024 for U.S. Appl. No. 17/843,059.

(Continued)

*Primary Examiner* — Patrick McAtee
*Assistant Examiner* — Scott Michael Diroma
(74) *Attorney, Agent, or Firm* — Plumsea Law Group, LLC

(57) ABSTRACT

Systems and methods for fault tolerant digital payments are disclosed. The system comprises a computing system that can automatically determine if payments should be processed using a digital payment processing system, or using a blockchain. When the system detects that communication with the digital payment processing system has been interrupted, the system may facilitate transactions through the blockchain. In particular, the system can retrieve private keys for addresses on the blockchain and facilitate customer payments through the blockchain.

10 Claims, 18 Drawing Sheets

(56) References Cited

U.S. PATENT DOCUMENTS

2020/0167790 A1\* 5/2020 Newman .............. H04W 4/021
2021/0012331 A1 1/2021 Higgins

OTHER PUBLICATIONS

Notice of Allowance mailed Aug. 26, 2024 for U.S. Appl. No. 17/843,059.
Siemon, Carsten, David Rueckel, and Barbara Krumay. "Blockchain technology for emergency response." (2020). (Year: 2020).

\* cited by examiner

SYSTEM AND METHOD FOR DIGITAL PAYMENTS USING BLOCKCHAIN WITH MERCHANT KEYS

CROSS-REFERENCE TO RELATED APPLICATIONS

This application claims the benefit of Provisional Patent Application No. 63/212,739 filed Jun. 21, 2021, and titled "System and Method for Digital Payments Using Blockchain with Merchant Keys," which is incorporated by reference herein in its entirety.

TECHNICAL FIELD

The present disclosure generally relates to digital payments, and specifically, to digital payments enabled using blockchains.

BACKGROUND

Digital payments are becoming increasingly popular in lieu of cash for transactions between merchants and customers. These include contactless payments, payments made using credit and debit cards, online payments, mobile cash, and electronic wallets. Processing digital payments often requires real time communications with third party systems to authorize and/or record transactions. This ensures fraudulent activity does not occur, and also ensures that the appropriate credits and debits are recorded for each transaction. For example, if a customer makes a credit card purchase at a merchant, the merchant's point-of-sale system must first confirm with a credit card processing system that the transaction is authorized. The processing system will then track amounts owed to the merchant and amounts owed by the customer to the credit card company.

The reliance of digital payment systems on real time communications for authorizing and recording financial transactions makes many digital payments systems difficult or even impossible to use in situations where communications with third party processing systems are interrupted. Such interruptions may occur, for example, due to natural catastrophes (for example, hurricanes, wildfires, or earthquakes) that can damage telephone, wireless and cellular network infrastructure.

Many customers must purchase goods, such as food, water, and emergency supplies, during a natural disaster. As the popularity of digital payments increases, fewer customers may have the cash on hand to purchase items when the infrastructure for processing digital payments is affected by the disaster.

There is a need in the art for a system and method that addresses the shortcomings discussed above.

SUMMARY

In one aspect, a computer implemented method for enabling digital transactions when communication between a point-of-sale system and a digital payment processing system is unavailable includes steps of retrieving a copy of a blockchain and receiving a set of digital account identifiers, a set of blockchain addresses residing on the blockchain, and a set of private keys. The method further includes steps of receiving transaction data from the point-of-sale system, the transaction data including a digital account identifier, and detecting that communication between the point-of-sale system and the digital payment processing system is unavailable. The method further including steps of retrieving, in response to detecting that communication between the point-of-sale system and the digital payment processing system is unavailable, a blockchain address associated with the digital account identifier and a private key corresponding to the blockchain address and using the private key to perform a transaction between the retrieved blockchain address and another blockchain address on the blockchain.

In another aspect, a computer implemented method for enabling digital transactions when communication between a point-of-sale system and a digital payment processing system is unavailable includes the steps of retrieving a copy of a blockchain, receiving information about a set of prefunded addresses and a set of private keys associated with the set of prefunded addresses, and receiving transaction data at a point-of-sale system, the transaction data including a digital account identifier and a transaction amount. The method further includes steps of detecting, at the point-of-sale system, that communication between the point-of-sale system and the digital payment processing system is unavailable and determining an available allocation amount for a customer account associated with the digital account identifier. The method further includes steps of determining if the transaction amount is less than the available allocation amount and selecting a subset of prefunded addresses whose total funds are greater than or equal to the transaction amount when the transaction amount is less than the available allocation amount. The method further includes steps of selecting a subset of private keys associated with the subset of prefunded addresses and using the subset of private keys to initiate a transaction between the subset of prefunded addresses and another address on the blockchain.

In another aspect, a fault tolerant digital payment system for enabling digital transactions when communication with a digital payment processing system fails includes a point-of-sale system, where the point-of-sale system is configured to communicate with the digital payment processing system over a wide area network. The system also includes an emergency payment management system, a local copy of a blockchain comprising prefunded blockchain addresses, and a set of private keys associated with the prefunded blockchain addresses The emergency payment management system is configured to receive a transaction request from the point-of-sale system, and detect, in response to receiving the transaction request, if communication between the point-of-sale system and the digital payment processing system is interrupted. The emergency payment management system is also configured to retrieve a prefunded blockchain address and a private key from the set of private keys in response to the transaction request if the communication between the point-of-sale system and the digital payment processing system is interrupted and perform a transaction between the prefunded blockchain address and another blockchain address on the local copy of the blockchain using the private key.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
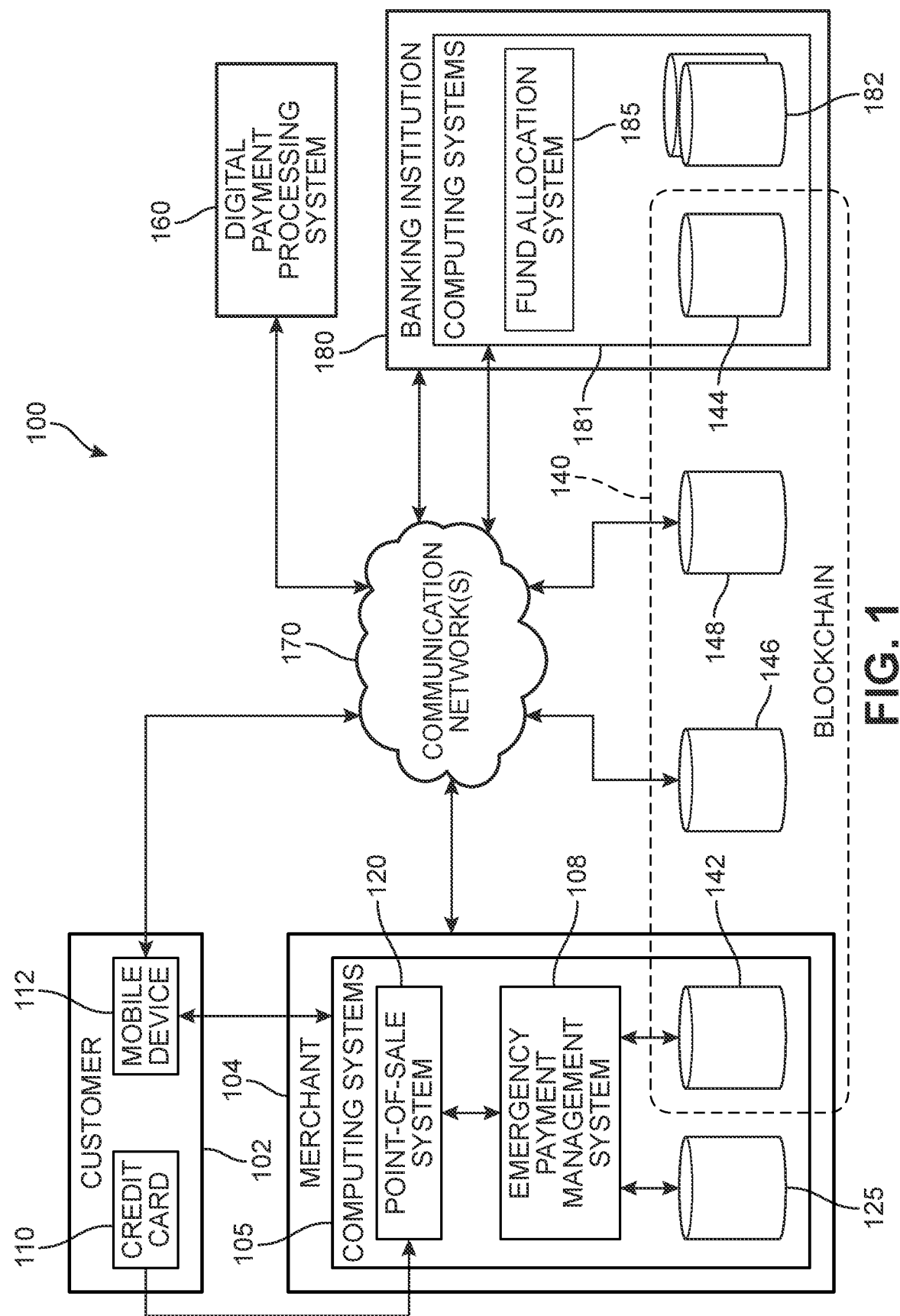
FIG. 1 is a schematic view of a fault tolerant digital payment system, according to an embodiment.

The embodiments provide systems and methods for allocating funds to members of a banking institution during a catastrophe or other emergency event and for facilitating digital payments even while communication networks may be interrupted. This is achieved by using a fault-tolerant digital payment system that can automatically switch back and forth between different methods of payment verification and recording according to different conditions. During normal conditions, a merchant's point-of-sale system communicates with a digital payment processing system in real time, which can verify and record transactions between a merchant and customers. If there is a natural catastrophe or other emergency that impacts communication networks, the system automatically switches to using a blockchain for verifying and recording transactions. In particular, the system can record transactions on a local copy of the blockchain, even when communication networks are down. The recorded transactions can then be broadcasted to other nodes of the blockchain when communications networks are restored. In some cases, addresses on the blockchain can be prefunded so that customers can use those funds to make purchases at the merchant. In one embodiment, private keys associated to the prefunded addresses can be distributed to a merchant's computing system(s) prior to any network interruptions. In another embodiment, private keys associated to the prefunded addresses can be distributed to a mobile device, or other suitable computing system, owned and/or operated by a customer.

As used herein, the term "digital payment" refers to any financial transaction that is mediated by digital systems, including computers, servers, mobile devices, wearable computing devices, as well as any other suitable digital systems. Digital payments can include, but are not limited to: credit card payments, debit card payments, mobile payments, and digital wallet payments. By contrast with cash, digital payments require transactions to be verified and digitally recorded, which often requires the use of digital infrastructure maintained by banks, credit card companies, and other financial institutions.

Digital payments can be verified and/or recorded using "digital payment processing systems," which may also be referred to as digital payment processing networks. Such systems comprise one or more financial institutions (such as banks, credit card companies, clearinghouses, and other entities) that facilitate authorization, authentication, and/or clearing and settling of digital payments. As an example, when a customer purchases an item from a merchant using a credit card, there may be a series of third parties, including the acquiring bank (which may be the merchant's bank), a credit card network that clears payments and transaction issues fees, and the issuing bank (which may be the customer's bank). Each of these entities may be involved in the separate processes of authorization, authentication and clearing/settlements. Other types of digital payments may utilize other entities to perform authorization, authentication and/or clearing/settlement. Importantly, each entity in the digital payment processing system may be physically removed from the merchant so that processing payments requires communication over one or more kinds of communication networks (such as telecommunication networks, wireless area networks like the Internet, or other suitable communication networks).

As used herein, the term "blockchain" refers to a growing list of records, referred to as blocks, that are linked (or chained) together. The blocks are connected using cryptographic hashes. Specifically, each block includes a cryptographic hash of the previous block, along with a timestamp and the current transaction data. In some cases, a blockchain may be managed over a peer-to-peer network in which participants act as nodes that store and process copies of the blockchain. These copies may be herein referred to as "local copies."

When used as a digital ledger for managing financial transactions, a blockchain may include addresses that can include, among other things, an amount of money or currency associated to that address. Each address may be a public key (or associated with a public key). The funds associated with the address are only accessible to by someone holding a corresponding private key. Using an appropriate private key, a user may make a transaction indicating that funds from a first address (the user's address) have been transferred to another address on the blockchain. It may be appreciated that in some embodiments, the blockchain may be based on digital currency, such as Bitcoin, or other digital tokens that function as currency. However, in other embodiments, the blockchain may simply record information about transactions between accounts that are held in one or more banks. In such an embodiment, funds may be moved between bank accounts in accordance with the transactions recorded within the digital ledger (blockchain). As an example, a first person and a second person may both have bank accounts at a particular banking institution. They may also have addresses on a blockchain that represent a ledger of transactions. When a transaction is recorded on the blockchain indicating a transaction between their two addresses, the banking institution may automatically reallocate funds between their banking accounts in accordance with the transaction recorded on the blockchain.

FIG. 1 is a schematic view of a fault-tolerant digital payment system 100 that facilitates processing financial transactions between a customer 102 and a merchant 104. As used herein, the term "merchant" refers to a person or entity offering goods or services for sale. Also, as used herein, the term "customer" refers to anyone participating in a financial transaction with a merchant. In some situations, the term "user" may also be used for any person or entity using the exemplary systems to purchase goods and services.

Merchant 104 may operate one or more computing systems 105. These computing systems may comprise one or more devices, each operating with one or more processors and suitable memory. In the exemplary embodiment, computing systems 105 include a point-of-sale system 120 and an emergency payment management system 108. Each of these systems could comprise a dedicated computing device running suitable software. For example, in some cases point-of-sale system could comprise a card scanning device that can communicate directly with a payment processing system. Alternatively, these systems could be software systems running on one or more common computing devices. For example, some embodiments could use software running on a tablet computing device and may include add-on hardware for reading credit and/or debit cards. In still other embodiments, a point-of-sale system can include dedicated hardware (such as a card scanning device) that communicates with a generic system (such as a tablet computing device) running software to facilitate financial transactions. For example, older point-of-sale systems could be adapted to receive modern digital payments by connecting the older point-of-sale hardware devices to newer computing devices (for example, phones or tablets).

Point-of-sale system 120 may include any software and hardware necessary for receiving customer financial information and processing financial transactions. As used herein, the term "customer financial information" includes any information that may be used as part of a financial transaction, including credit card information (such as a credit card number, expiration date, and a card verification code), debit card information, e-wallet information, as well as any other suitable information required to make a digital payment. As an example, point-of-sale system 120 could include a card reader (not shown) for receiving credit and/or debit card information. Point-of-sale system 120 could also include hardware and software for communicating with one or more financial institutions.

Computing systems 105 may also include a merchant database 125. Merchant database 125 may be used to store various kinds of account information for customers. In some embodiments, merchant database 125 could be used to store private keys that correspond to addresses (public keys) on a blockchain. In some embodiments, merchant database 125 may also be used to store other information, including blockchain addresses corresponding to the private keys, as well as information for identifying digital accounts and/or transactions.

Emergency payment management system 108 ("management system 108") may include resources for automatically managing various processes to facilitate seamless payments between merchants and customers, even when there are interruptions in one or more communication networks. These processes, which are described in further detail below, can include determining if payments should be processed using a digital payment processing system or network, or if payments should be processed using a blockchain. In some cases, management system 108 can also include provisions for managing emergency monetary allocations to customers that are recorded using a blockchain. In some cases, management system 108 may distribute emergency funds to customers in response to one or more triggers. The triggers could include, for example, detection of a network communications outage and/or detection that an emergency has occurred and is ongoing.

Systems associated with merchant 104 may communicate with other remote systems (or networks) using one or more communication networks 170. Exemplary communication networks can include, but are not limited to: personal area networks (PANs), local area networks (LANs) and wide area networks (WANs). In some embodiments, communication networks 170 may comprise a combination of PANs, LANs, and WANs. In some embodiments, communication networks can comprise telecommunication networks, such as telephone networks. For example, some merchants may use older point-of-sale systems that communication with digital payment processing systems using telephone lines.

Verification of digital payments between merchant 104 and customer 102 may be facilitated by a digital payment processing system 160, also referred to as a digital payment processing network. Exemplary digital payment processing systems may include credit card processing systems, as well as other suitable systems (or networks) for processing and verifying digital payments. In one embodiment, point-of-sale system 120 communicates with digital payment processing system 160 via communication networks 170.

During catastrophes and other emergencies, communication networks may be interrupted, making it difficult or even impossible to process digital payments using a remote digital payment processing system. In such cases, the embodiments provide a solution for facilitating transactions locally between merchants and customers, by leveraging a blockchain.

In the exemplary embodiment shown in FIG. 1, a banking institution 180 and merchant 104 both maintain local copies of a blockchain 140. More specifically, computing systems 105 operated by merchant 104 and computing systems 181 operated by banking institution 180 may maintain local copies of blockchain 140. These include a merchant-side local copy 142 and a bank-side local copy 144. That is, both merchant 104 and banking institution 180 may operate nodes of blockchain 140. As seen in FIG. 1, blockchain 140 may also include additional local copies (for example, local copy 146 and local copy 148) that are part of the network but stored outside of merchant 104 and banking institution 180. In some cases, these additional local copies could be managed by other participants on the blockchain. Examples of other participants could include, but are not limited to: other merchants and other banking institutions.

In addition to storing a local copy of the blockchain, banking institution 180 may also maintain various banking databases 182 that store information about customer banking accounts. These banking databases 182 may be operated as part of computing systems 181.

In an exemplary embodiment, banking institution 180 may provide emergency funds during a catastrophe that are made available to its banking customers using blockchain 140. That is, banking institution 180 could use blockchain 140 as a digital ledger to track transactions between consumers and merchants. Moreover, at the beginning of the catastrophe the ledger would record a particular amount of money available to each customer. Specifically, addresses on the blockchain may be prefunded and then access to those addresses provided directly or indirectly to customers, as described in further detail below.

In some embodiments, computing systems 181 may further include fund allocation system 185. Fund allocation system 185 may be configured to automatically allocate emergency funds to addresses on the blockchain in response to various triggers, as described in further detail below. In other embodiments, fund allocation systems could be implemented within computing systems 105 of merchant 104. Moreover, in still other cases, allocations could be made by smart contracts that live on the blockchain. In such cases, the blockchain may be further associated with oracles that can deliver external information that may be used to trigger allocation contracts. Details of such a configuration are described in further detail below and shown, for example, in FIGS. 15-16.

In some embodiments, blockchain 140 may be used to record and verify cryptocurrency transactions that take place on the blockchain. In such cases, funds can be transferred on and off the blockchain using cryptocurrency exchanges. In other embodiments, blockchain 140 may be used to store information about accounts held off the blockchain. For example, a bank could have a ledger indicating funds held by different customers of the bank in accounts managed internally by the bank (rather than on the blockchain itself).

An important aspect of the exemplary system shown in FIG. 1 is that processing financial transactions between a customer and a merchant using processing system 160 may require real-time communication between point-of-sale system 120 and processing system 160. This communication may occur over communication networks 170, such as the Internet. In some cases, this may be the default method of processing financial transactions between customers and merchants.

However, if communication networks are interrupted, financial transactions cannot be processed by processing system 160. By contrast, using the exemplary configuration, financial transactions can be processed locally using blockchain 140, even when there is an interruption in communications with processing system 160. In particular, as described in further detail below, financial transactions can be recorded locally and then, when communications with the full blockchain network are restored, the transactions can be broadcasted to the whole network.

Thus, it may be appreciated that the exemplary set-up facilitates switching back and forth between processing financial transactions using processing system 160 and blockchain 140, depending on various conditions. The embodiments therefore enable a fault-tolerant method of processing digital payments, which is specifically tolerant of interruptions in communication networks.

In use, customer 102 may use a payment card. As used herein, the term payment card refers to any credit card, debit card, gift card, or other suitable card for making payments. In this embodiment, customer 102 uses credit or debit card 110 ("card 110") to make purchases at merchant 104. For example, card 110 can be swiped at an appropriate terminal of point-of-sale system 120 (for example, a card reader). Alternatively, a customer could use mobile device 112 to initiate a digital payment with point-of-sale system 120. In either case, during normal operation, the transaction associated with card 110 may be processed using processing system 160. However, if communication between point-of-sale system 120 and processing system 160 has been interrupted (for example, due to a catastrophic event), financial transaction processing can occur locally using local copy 142 of blockchain 140.

Figure 2:
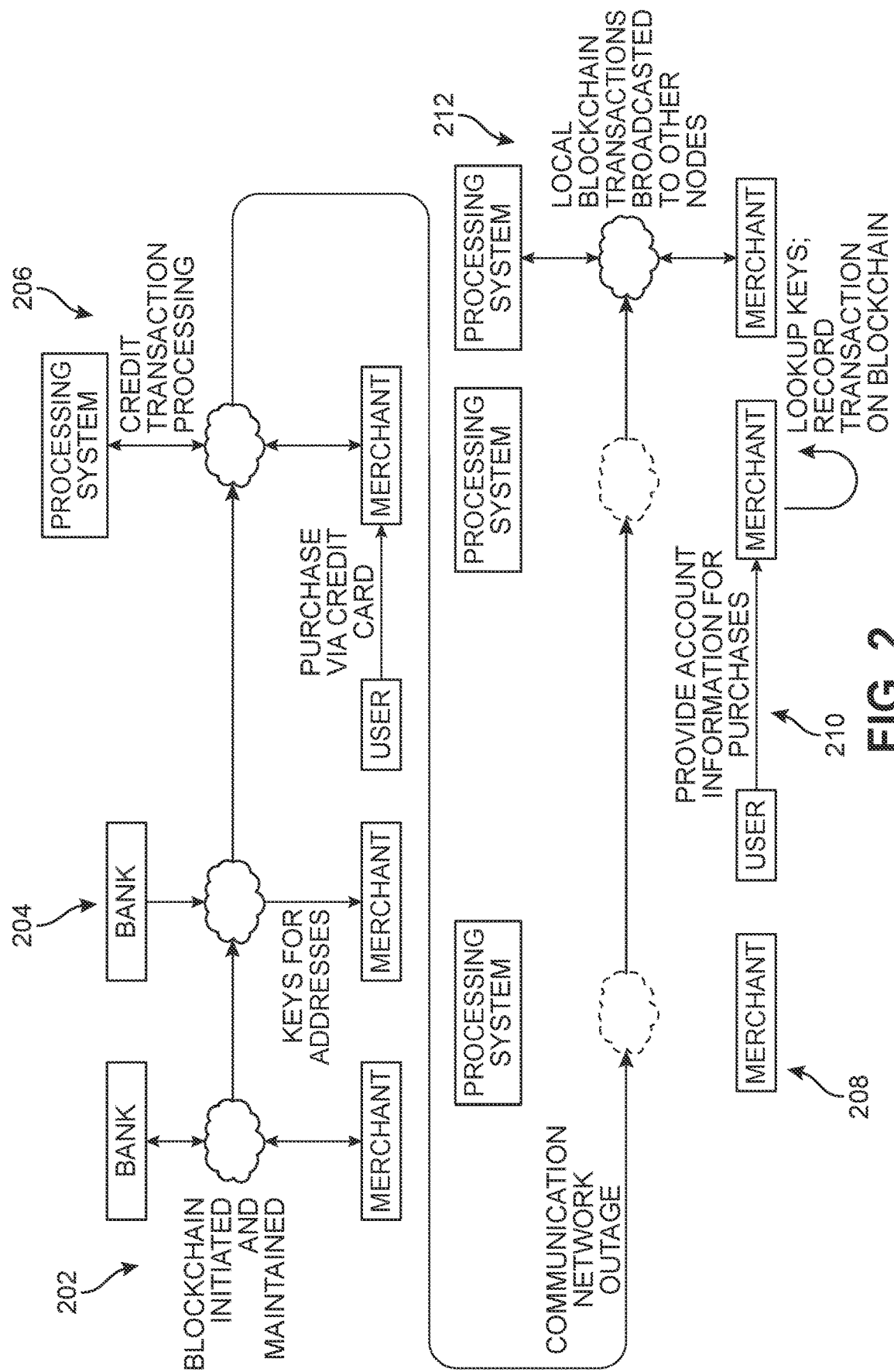
FIG. 2 is a schematic view of a sequence of events, according to an embodiment.

To clarify the operation of the exemplary system, FIG. 2 shows a timeline of events for facilitating financial transactions between merchants and customers before, during, and after a catastrophic event where real-time communications with a financial institution have been interrupted.

As shown in FIG. 2, the blockchain may be initiated and maintained during a first event 202. Specifically, both the bank and the merchant may download local copies of the blockchain and operate as nodes of the blockchain prior to a catastrophe or other emergency.

During a second event 204, bank 240 distributes keys for addresses on the blockchain to merchant 242. In some cases, the keys are private keys that provide access to funds associated with particular addresses on the blockchain. In some cases, the different addresses may be further associated to different customers, as described in further detail below. As an example, in some cases information may be retrieved from a bank's databases (such as databases 182 in FIG. 1), including private keys, addresses, and other information. This information may then be securely sent to merchant database 125 over a communication network such as the Internet.

During a third event 206, a customer (referred to as a "user" in FIG. 2) makes a purchase with their credit (or debit) card. In this case, information retrieved by the point-of-sale system is sent to a digital payment processing system to be verified and recorded. In particular, it should be noted, that the processing of the financial transaction during event 206 requires communication between the digital payment processing system and the merchant's point-of-sale system, which is facilitated by a communication network, such as the Internet.

Next, during a fourth event 208, a communication network outage occurs. In some cases, such an outage could be the result of a catastrophe (such as a tornado, hurricane, wildfire, or other catastrophe) that damages parts of one or more communication networks. During this outage, there may be no way to process digital payments using a digital payment processing system. However, customers may still have an urgent need to make purchases (for example, buying food, water, and other emergency supplies) even while the network is down.

In a fifth event 210, using the exemplary systems and methods, a customer (user) is still able to transact with a merchant by providing the merchant with financial account information. Examples of financial account information that could be provided include, but are not limited to, a banking customer number, a bank account number, a credit card number, or some other suitable piece of information that allows the merchant to match the customer to a designated address on the blockchain. In some cases, during event 210, a customer may swipe/insert his or her credit card at a point-of-sale system, which automatically extracts the necessary financial account information, such as a credit card number. Once the customer provides the necessary information, the merchant can look up a private key associated with the blockchain address associated to that customer and record transactions on the blockchain using the key.

During event 212, once the communication network is restored, the transactions performed on the local blockchain while the network was down can be broadcasted to other nodes of the blockchain. This facilitates adding the appropriate transaction blocks to all copies of the blockchain.

In some other embodiments, it may be possible to operate a localized blockchain network, comprising blockchain nodes that are localized geographically. For example, many merchants in a particular geographic area may all run blockchain nodes (that is, may all have and manage local copies of the same blockchain). Moreover, their close geographic proximity may allow them to be connected even when larger scale communication networks are interrupted. For example, merchants in a particular geographic area (such as the downtown area of a city) could be connected via ethernet or a suitable wireless network with sufficient range to connect nodes that are separated by tens or hundreds of feet. This local blockchain network could then operate in real-time, with each local copy of the blockchain synced at all times. As an example, referring to FIG. 1, local copy 146 and local copy 148 of blockchain 140 could each be controlled by other merchants that are sufficiently close to merchant 104 to allow the nodes to be connected in a localized network.

Such a configuration could help mitigate any attempts by users to make fraudulent transactions, by "double spending" funds at two different merchants before the local blockchain copies have been synced with the broader blockchain network. This configuration may be further facilitated by the use of geofencing, which is discussed in further detail below. In particular, geofencing could be used to limit the geographic range that such a localized network would be required to operate over, since users could not make purchases on the blockchain outside of predetermined geographic regions.

Figure 3:
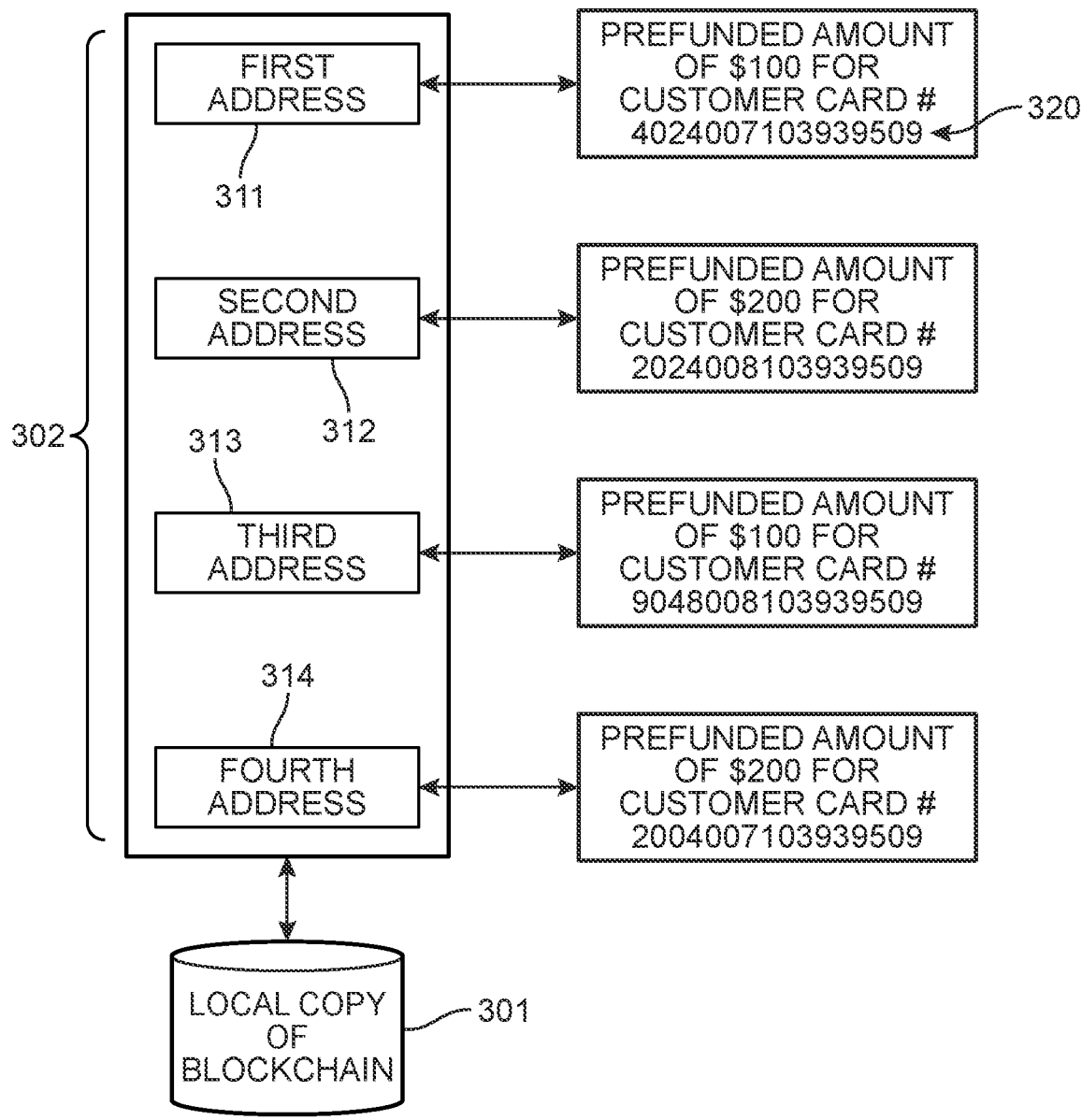
FIG. 3 is a schematic view of a blockchain with prefunded addresses, according to an embodiment.

FIG. 3 is a schematic view of an embodiment of data that may be distributed to a merchant by a banking institution prior to a catastrophe to enable the use of emergency funds. In particular, the data may be stored on a local copy 301 of a blockchain. For purposes of illustration, the exemplary embodiment shows four addresses ("First Address," "Second Address," and so on) on the blockchain that have been prefunded in the case of an emergency. That is, these funds have been recorded on the blockchain ahead of any network outage, since such an outage could affect communication between different nodes of the blockchain network.

As seen in FIG. 3, the blockchain stores a set of addresses 302. Set of addresses 302 further comprise a first address 311, a second address 312, a third address 313, and a fourth address 314. For clarity, only four addresses are shown, however it may be appreciated that a blockchain could include any number of addresses and in some cases could include hundreds of thousands or even millions of addresses with prefunded amounts of money.

In the exemplary embodiment, each address has been funded with an amount of money. For example, second address 312 and fourth address 314 have both been funded with one hundred dollars. Likewise, first address 311 and third address 313 have both been funded with two hundred dollars.

Moreover, as seen in FIG. 3, each address is associated with a different digital account identifier. As used herein, the term "digital account identifier" refers to any kind of identifying information that can be used to tie a digital account to one or more blockchain addresses and/or private keys. In some embodiments, digital account identifiers may comprise credit card numbers or debit card numbers. In other embodiments, however, the digital account identifier could be a bank account number, customer name, or any other suitable identifying information. In particular, the digital account identifiers can be any suitable kind of information that can be used to designate a given prefunded blockchain address with a particular customer.

In the example of FIG. 3, each digital account identifier is a credit card number. For example, first address 311 is associated with a first digital account identifier 320 ("Customer Card #4024007103939509") and second address 312 is associated with a second digital account identifier ("Customer Card #2024008103939509").

To further clarify the embodiments, consider a scenario where a natural disaster has occurred and many members of a banking institution are unable to make purchases using credit cards, debit cards or other digital payment systems, due to network outages. In this example, the first customer with first digital account identifier 320 is given one hundred dollars for emergency purchases. Specifically, the bank provides first address 311 on the blockchain, which holds $100 (or an equivalent amount of some digital currency) that has been preauthorized for use. Moreover, the merchant has been given a private key that can be used to transfer funds from first address 311 to any other address on the blockchain. When the first customer swipes his or her card at the merchant's point-of-sale system, the point-of-sale system (or some other system in communication with the point-of-sale system) can retrieve first address 311. The point-of-sale system can also retrieve a corresponding private key associated with first address 311. In some cases, these can be retrieved by looking up first digital account identifier 320 in a database table managed by the merchant.

Figure 4:
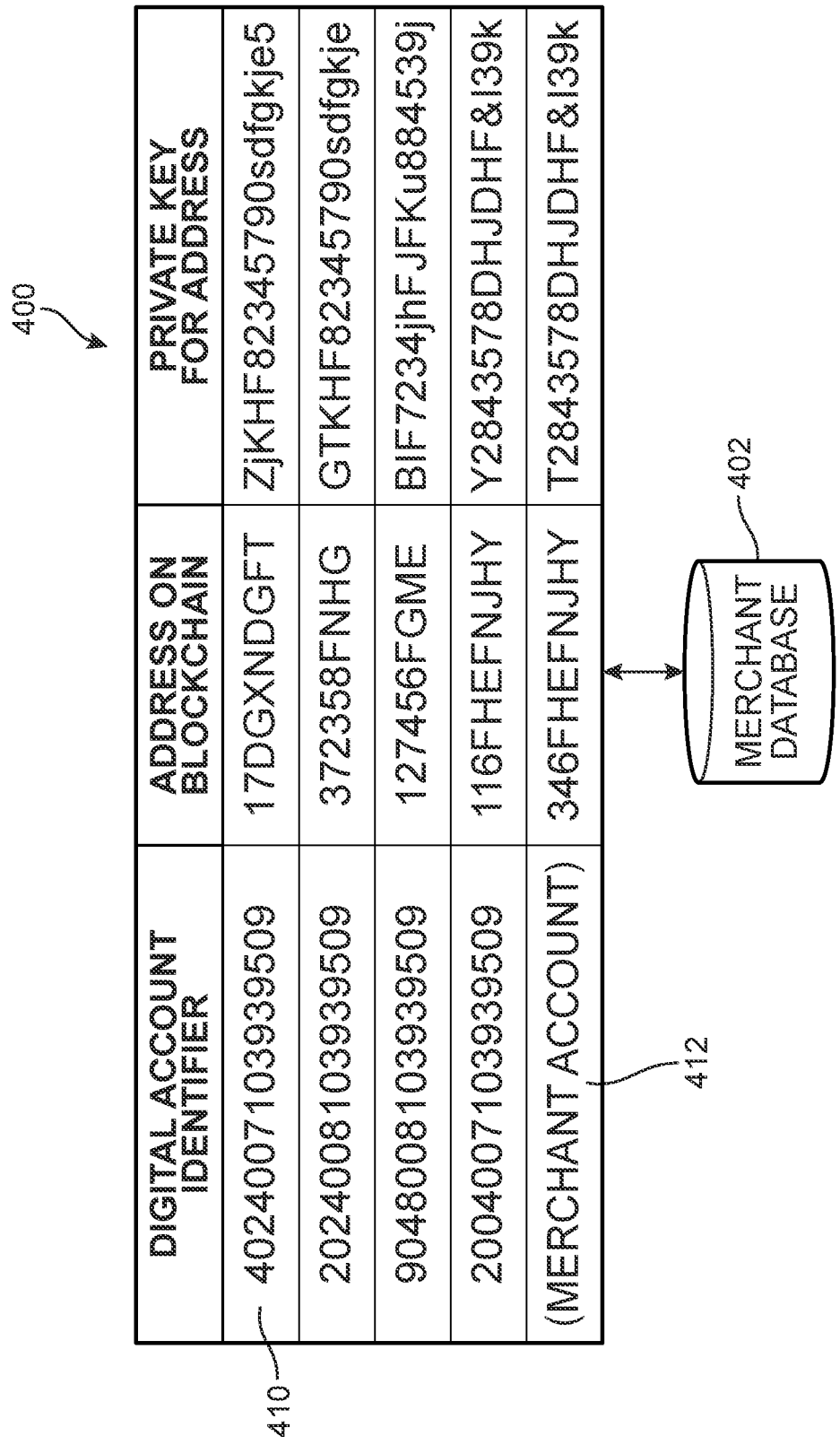
FIG. 4 is a schematic view of a merchant database storing data, according to an embodiment.

An exemplary database table is shown in FIG. 4. Here, a database table 400 is stored within a merchant database 402 that may be operated by the merchant (or other third party). When a customer swipes his or her card, the point-of-sale system may look-up the associated address and private key associated with that card number. The system may then use the retrieved private key to make purchases using funds in the address on the ledger. For example, if the member is attempting to buy an item for $10, the system would perform a transaction on the blockchain that moves $10 from the blockchain address associated with the digital account identifier to another address on the blockchain that holds funds to be paid to the merchant by the bank or other financial entity. As an example, using the table in FIG. 4, the merchant could use the retrieved private keys to move $10 from the address associated with the customer making a purchase (for example, first digital account identifier 410) to another address associated with the merchant's account (for example, merchant digital account identifier 412).

In an alternative embodiment, a bank or other financial institution could generate addresses with predetermined funding amounts that are not tied to a particular digital account identifier. This may allow merchants to provide emergency funds in a discretionary manner to different customers, including customers that are not customers of a participating bank and therefore lack a digital account identifier.

Figure 5:
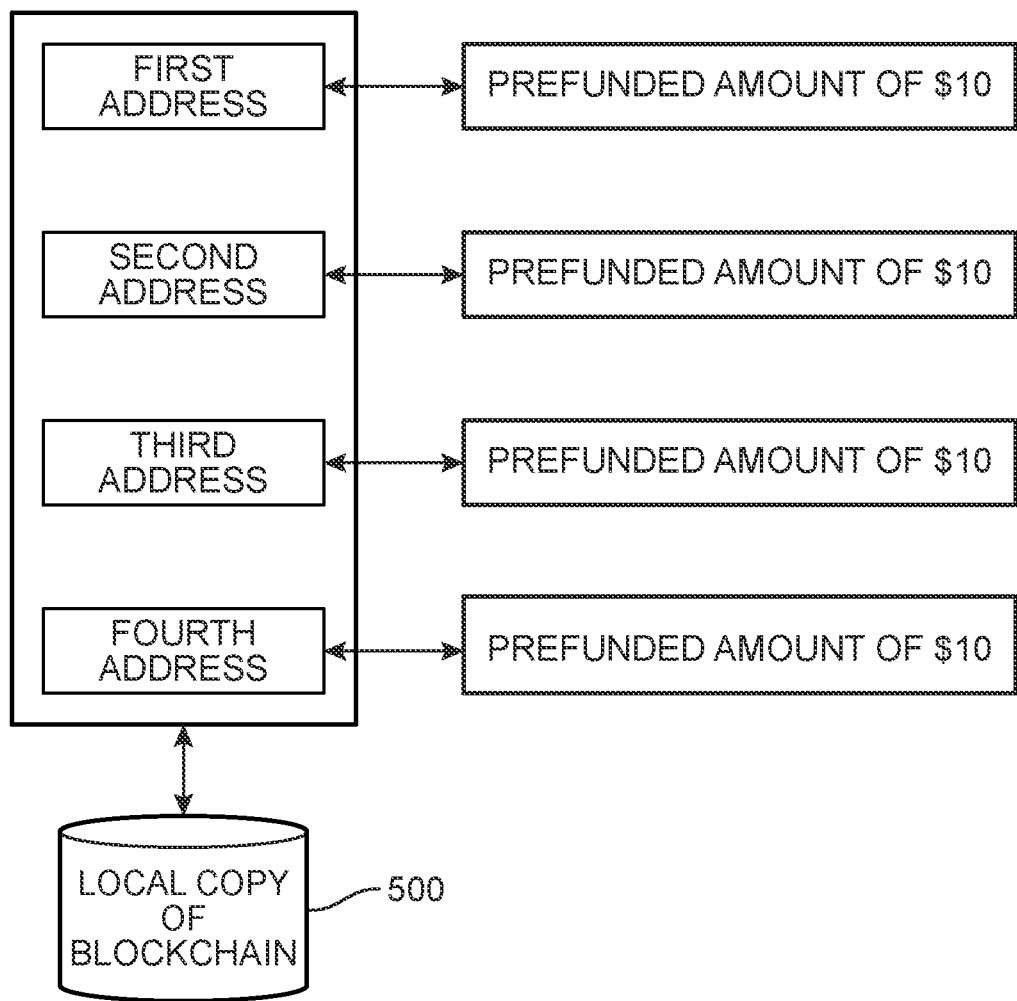
FIG. 5 is a schematic view of a blockchain with prefunded addresses, according to another embodiment.

In FIG. 5, a blockchain 500 includes a set of addresses prefunded in the amount of $10 each. The merchant may also have a set of private keys corresponding to the set of addresses. By contrast with the previous embodiment, these prefunded addresses are not tied to particular customers. This may allow merchants to provide discretionary funds to customers on an as-needed basis, rather than tying the funds to customer card numbers or other account information.

To further clarify the embodiment of FIG. 5, consider a scenario where a natural disaster has occurred and many members of a banking institution are unable to make purchases using credit and/or debit cards, due to network outages. As customers try to make purchases in the merchant's store, the merchant may retrieve prefunded addresses and associated private keys. The merchant could then use the private keys to transfer funds from one or more of the prefunded addresses to another address (such as an address holding funds that will be paid to the merchant).

As an example, a customer may wish to buy some food for $20. As the payment processing system may be down, the merchant could then use the funds in two $10 blocks to make the purchase for the customer. In embodiments where the institution providing emergency funds requires repayment of any emergency funds, the merchant may record information about the customer so that the merchant or institution can request repayment of the emergency funds at a later time.

Figure 6:
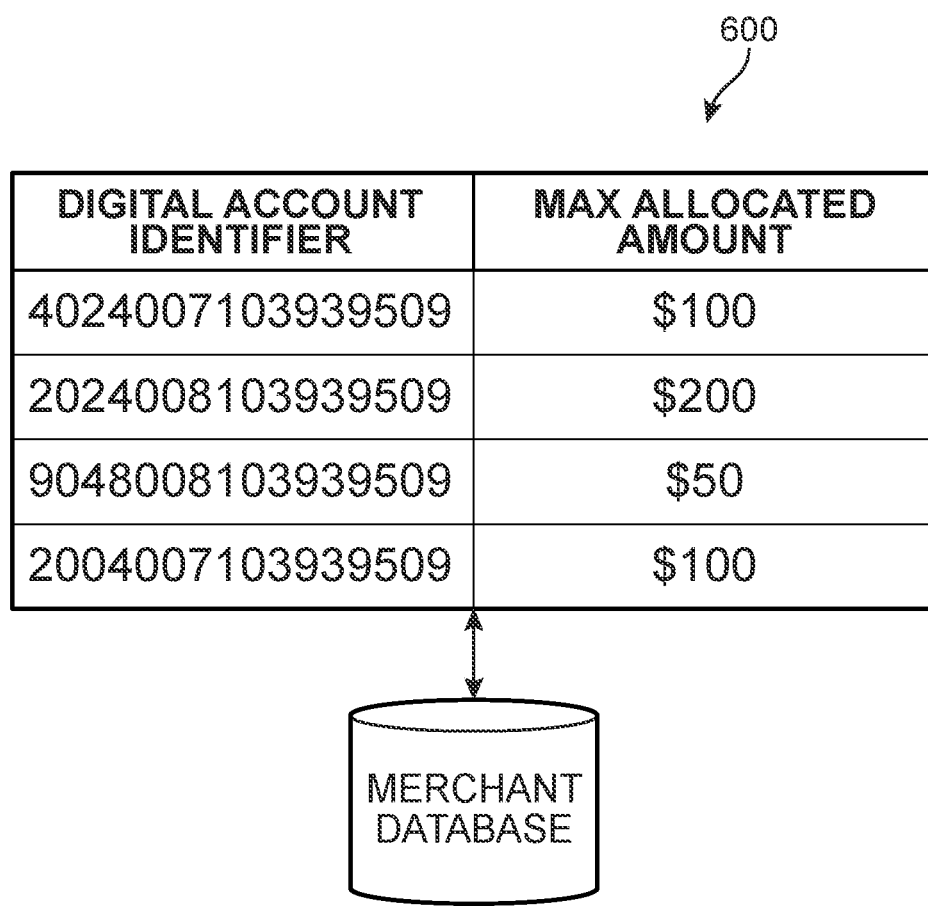
FIG. 6 is a schematic view of a merchant database storing data, according to an embodiment.

In some cases, a banking institution may provide data including a maximum allocated amount of funds for different customers. For example, FIG. 6 shows an exemplary table 600 of data that may be stored in a merchant database. Table 600 includes entries that match a maximum allocated amount of funds to a digital account identifier (such as a credit card number). These different allocation amounts may reflect various factors, such as credit worthiness, account balances, proximity to the geographic regions affected by the catastrophe/emergency, as well as any other suitable factors. Thus, a merchant can use this information to allocate an appropriate amount of funds to different customers in cases where the addresses are not all tied to specific customers (such as banking members).

The configuration illustrated in FIGS. 5-6 may provide maximum flexibility for a merchant to facilitate financial transactions with customers during an emergency. For example, using generic addresses that are not specific to a particular customer allows the merchant the option of providing a discretionary amount of funds to any customers deemed to be in urgent need of particular items (food, water, etc.).

It may be appreciated that the ultimate source of funds residing in addresses on a blockchain could vary from one embodiment to another. In some embodiments, a bank could require customers to sign-up and prepay for these emergency funds ahead of time, so that the funds can be retrieved during a catastrophe. In other cases, funds may be paid by a financial institution during a catastrophe and then customers could reimburse the financial institution after the catastrophe has subsided. In other cases, a bank or other financial institution could provide the funding itself as part of a catastrophe response.

Figure 7:
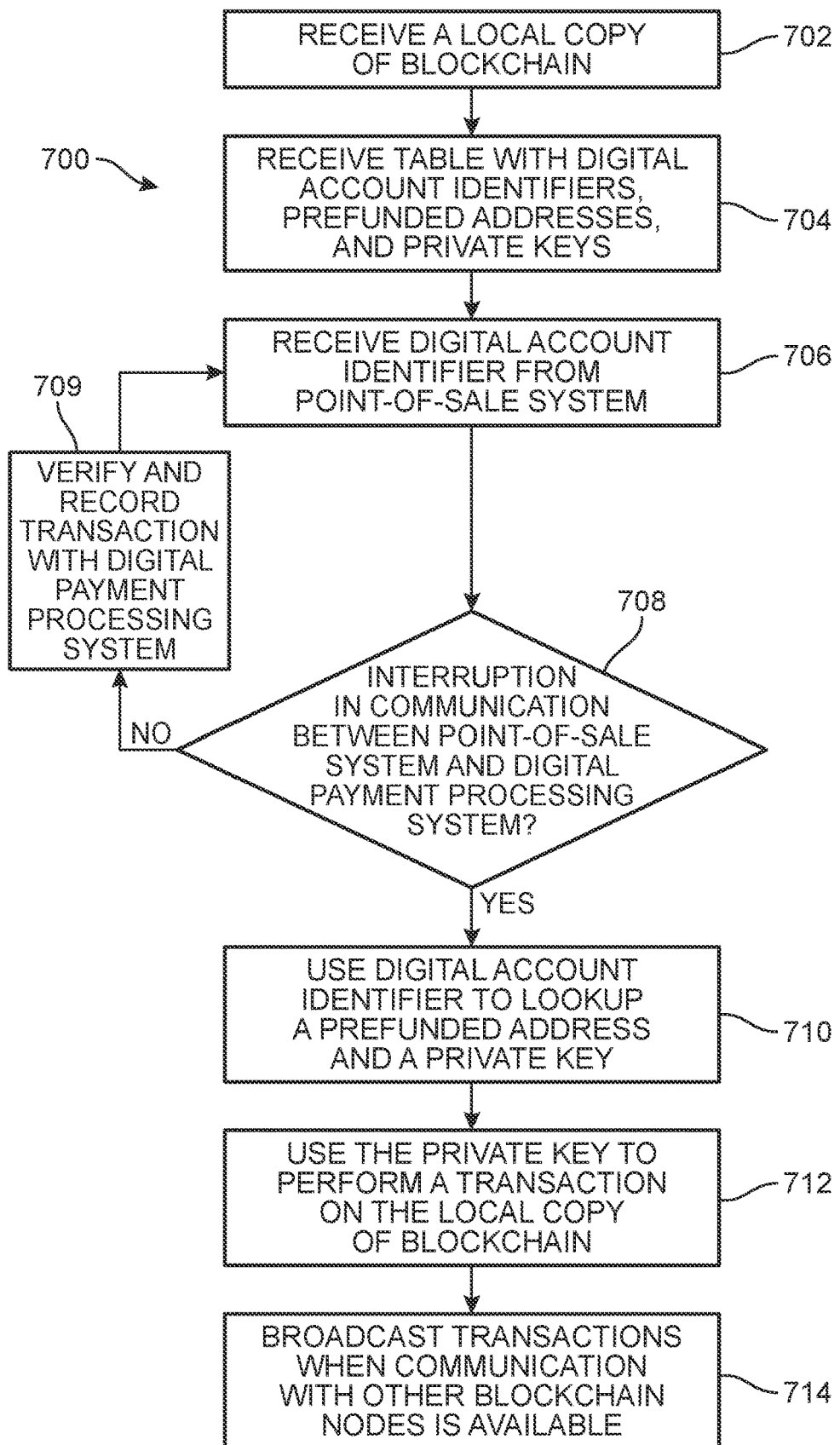
FIG. 7 is a schematic view of a computer implemented method of managing payments, according to an embodiment.

FIG. 7 is a schematic view of a computer implemented method 700 for enabling digital transactions when communication between a point-of-sale system and a digital payment processing system is unavailable. In some cases, one or more steps of method 700 could be performed by computing systems associated with a merchant. In some cases, one or more steps of method 700 could be performed by an emergency payment management system running on one or more computing systems.

In step 702, a computing system may receive a local copy of a blockchain. In particular, the computing system may operate as one node of a blockchain that is distributed over two or more nodes. Next, in step 704, the computing system could receive data including digital account identifiers, prefunded addresses on the blockchain, and private keys that provide access to the prefunded addresses. In some cases, the data could be stored as a table (for example, table 400 of FIG. 4).

In step 706, the computing system receives a digital account identifier from a point-of-sale system when a customer attempts to make a payment through the point-of-sale system. In some cases, the digital account identifier could be a credit or debit card number. In other cases, the digital account identifier could be a mobile payment account number.

In step 708, the computing system checks for any interruptions in communication between the point-of-sale system and a digital payment processing system. In some cases, this check may comprise requesting information from the point-of-sale system to determine the communication status with the digital payment processing system. In some cases, this check may include pinging the digital payment processing system and checking for a response.

If there are no communication issues, the computing system may use the digital payment processing system to verify and record the financial transaction, as in step 709. That is, the system uses the default mode of making the digital payment via credit card and/or debit card. The system then proceeds back to step 706 when the next customer attempts to make a payment at the point-of-sale system.

If the system detects an interruption in communication in step 708, which may have been caused by a catastrophe or other emergency, the system proceeds to step 710. In step 710, the system uses the digital account identifier to look up the prefunded address and private key associated to the digital account identifier.

In step 712, the system uses the private key to perform a transaction on the local copy of the blockchain. This may include initiating a payment from the prefunded address associated to the private key to another address. In some cases, the other address may be an address associated with the merchant. That is, the other address may be an address which is controlled by the merchant, who has possession of the associated private key. Alternatively, the other address may be associated with a bank or other financial institution. Funds transferred to this other address could then be paid to the merchant at a later time.

It may be appreciated that during a catastrophe, communication between nodes of the blockchain may also be interrupted, and therefore the blockchain cannot always be updated in real-time. In such cases, the nodes may wait until communication has been reestablished before broadcasting new transactions to the entire blockchain network. In step 714, therefore, the computing system may broadcast any blockchain transactions to other nodes in the blockchain network once communication has been restored.

Figure 8:
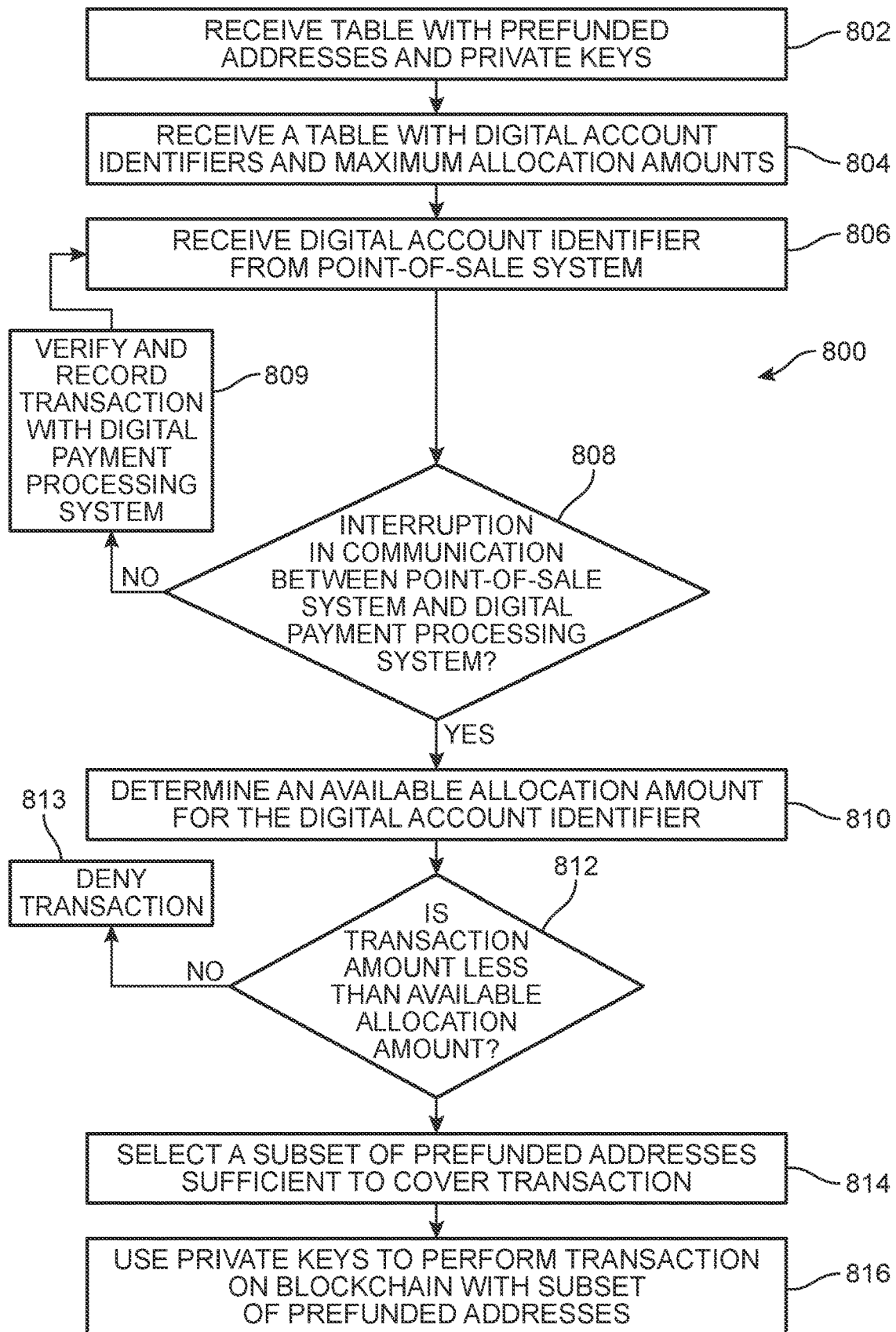
FIG. 8 is a schematic view of a computer implemented method of managing payments, according to an embodiment.

FIG. 8 is a schematic view of a computer implemented method 800 for enabling digital transactions when communication between a point-of-sale system and a digital payment processing system is unavailable. In the configuration of FIG. 8, a merchant is given a list of prefunded addresses and associated private keys, but the addresses are not necessarily designated for particular customers. As already described above, this alternative configuration allows merchant's more discretion in providing funds to customers.

In step 802, a computing system may receive a table with prefunded addresses on a blockchain and associated private keys. In step 804, the computing system may also receive a table with digital account identifiers and maximum allocation amounts. An example of such a table is shown in FIG. 6, and described above.

In step 806, the system receives a digital account identifier from a point-of-sale system when a customer attempts to make a purchase.

In step 808, the computing system checks for any interruptions in communication between the point-of-sale system and a digital payment processing system. If no interruption is occurring, the system verifies and records transactions via the digital payment processing system in step 809. If there is an interruption, the system proceeds to step 810.

In step 810, the computing system determines an available allocation amount for the digital account identifier. This available allocation amount may be determined using the maximum allocation amounts determined in step 804. Next, in step 812, the system confirms that the transaction amount for the purchase is less than the available allocation amount determined in step 810. If not, the system denies the transaction in step 813. Otherwise, the system proceeds to step 814 to select a subset of prefunded addresses whose total funds are sufficient to cover the transaction. Then in step 816, the computing system uses the associated private keys for the subset of prefunded addresses to perform the transaction on the blockchain.

In some embodiments, private keys for prefunded addresses on a blockchain could be distributed directly to customers prior to an emergency or catastrophe. In such cases, a merchant may still retain a copy of the blockchain locally to facilitate digital transactions on the blockchain, but may not hold the private keys. Instead, the private keys are held by end users (customers) who are making purchases from the merchant.

Figure 9:
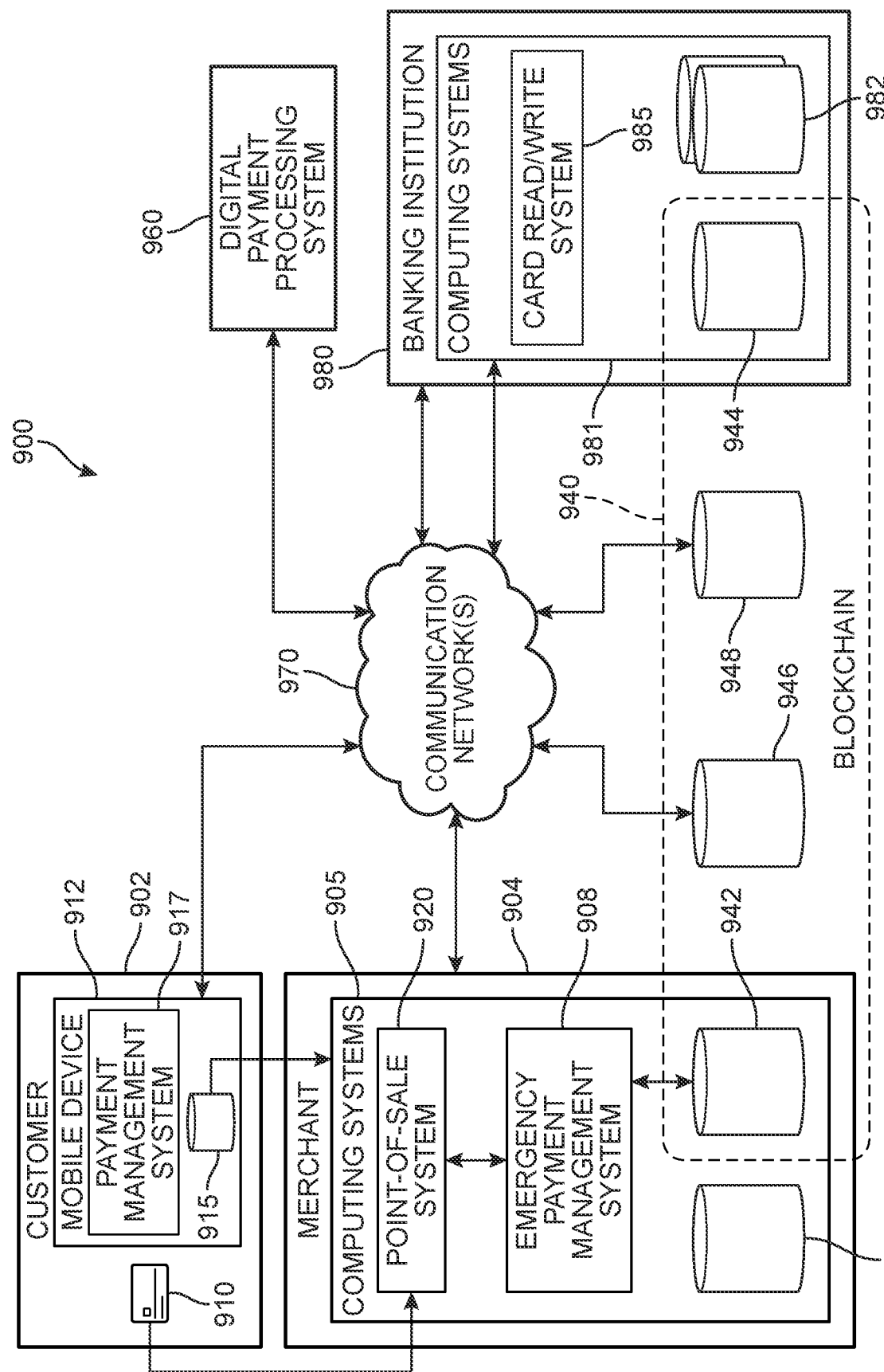
FIG. 9 is a schematic view of a fault tolerant digital payment system, according to another embodiment.

FIG. 9 is a schematic view of a fault-tolerant digital payment system 900 that is configured to process financial transactions between a customer 902 and a merchant 904.

Merchant 904 may operate one or more computing systems 905. These computing systems may comprise one or more devices, each operating with one or more processors and suitable memory. In the exemplary embodiment, computing systems 905 include a point-of-sale system 920 and an emergency payment management system 908. Each of these systems could comprise a dedicated computing device running suitable software.

Emergency payment management system 908 ("management system 908") may include resources for identifying when a catastrophe or other emergency has occurred and automatically managing various processes to facilitate seamless payments between merchants and customers. These processes, which are described in further detail below, can include determining if payments should be processed using a third-party system or network, or if payments should be processed using a blockchain. In some cases, management system 108 can also include provisions for managing emergency monetary allocations to customers that are recorded using a blockchain. In some cases, management system 908 may distribute emergency funds to customers in response to one or more triggers. The triggers could include, for example, detection of a network communications outage and/or detection that an emergency has occurred and is ongoing.

In some embodiments, computing systems 905 may also include database 925 for storing various kinds of data. In some embodiments, a merchant may store blockchain addresses associated to particular digital account identifiers in database 925, as described in detail below.

Systems associated with merchant 904 may communicate with other remote systems (or networks) using one or more communication networks 970. Exemplary communication networks can include, but are not limited to: personal area networks (PANs), local area networks (LANs) and wide area networks (WANs). In some embodiments, communication networks 970 may comprise a combination of PANs, LANs, and WANs. In some embodiments, communication networks 970 could include other telecommunication networks including a telephone network.

Processing of digital payments between merchant 904 and customer 902 may be facilitated by a digital payment processing system 960. Exemplary digital payment processing systems may include credit card processing systems, as well as other suitable systems (or networks) for processing digital payments. In one embodiment, point-of-sale system 920 communicates with digital payment processing system 960 via communication networks 970.

During catastrophes and other emergencies, communication networks may be interrupted, making it difficult or even impossible to process digital payments using a remote digital payment processing system. In such cases, the embodiments provide a solution for facilitating transactions locally between merchants and customers by leveraging a blockchain.

In the exemplary embodiment shown in FIG. 9, a banking institution 980 and merchant 904 both maintain local copies of a blockchain 940. More specifically, computing systems 905 operated by merchant 904 and computing systems 981 operated by banking institution 980 may maintain local copies of blockchain 940. These include a merchant-side local copy 942 and a bank-side local copy 944. That is, both merchant 904 and banking institution 980 may operate nodes of a blockchain network. As seen in FIG. 9, blockchain 940 may also include additional local copies (for example, local copy 946 and local copy 948) that are part of the network but stored outside of merchant 904 and banking institution 980. In some cases, these additional local copies could be managed by other participants in the blockchain network. Examples of other participants could include, but are not limited to: other merchants and other banking institutions.

In addition to storing a local copy of the blockchain, banking institution 980 may also maintain various banking databases 982 that store information about customer banking accounts. These banking databases 982 may be operated as part of computing systems 981.

In an exemplary embodiment, banking institution 980 may provide emergency funds during a catastrophe that are made available to its banking customers using blockchain 940. That is, banking institution 980 could use blockchain 940 as a digital ledger to track transactions between consumers and merchants. Moreover, at the beginning of the catastrophe the ledger would record a particular amount of money available to each customer. Specifically, addresses on the blockchain may be prefunded and then access to those addresses provided directly or indirectly to customers, as described in further detail below.

In some embodiments, blockchain 940 may be used to record and verify cryptocurrency transactions that take place on the blockchain itself. In such cases, funds can be transferred on and off the blockchain using cryptocurrency exchanges. In other embodiments, blockchain 940 may be used to store information about accounts held off the blockchain. For example, a bank could have a ledger indicating funds help by different customers of the bank in accounts managed internally by the bank (rather than on the blockchain itself).

By contrast with the previous embodiment shown in FIG. 1 and described above, in the present embodiment private keys for addresses on the local copy 942 of blockchain 940 may held by the customer, rather than the merchant. Specifically, private keys may be transmitted from computing systems 981 of banking institution 980 to mobile device 912 prior to any network interruptions. The private keys may be stored in a database 915 within an application running on mobile device 912. This ensures that the private keys are accessible for local transactions with the merchant even when wide area networks are down.

In some embodiments, mobile device 912 further includes a payment management system 917. Payment management system 917 can automatically select the appropriate type of payment information according to the communication status between point-of-sale system 920 and digital payment processing system 960. This allows mobile device 912 to selectively supply credit card numbers, private keys, or other digital payment information to the point-of-sale system depending on whether the transaction will be processed using the digital payment processing system or using a blockchain. This ensures mobile device 912 does not send private keys to a point-of-sale system in situations where the keys are not needed.

Communication between mobile device 912 and computing systems 905 of merchant 904 could be facilitated by any suitable communication method and/or protocol. In some cases, private keys can be sent from mobile device 912 to computing systems 905 using a local area network or a personal area network. In some cases, private keys can be transmitted using a Bluetooth connection between mobile device 912 and one or more components of computing systems 905. In other cases, private keys could be transmitted using near field communication (NFC).

Figure 11:
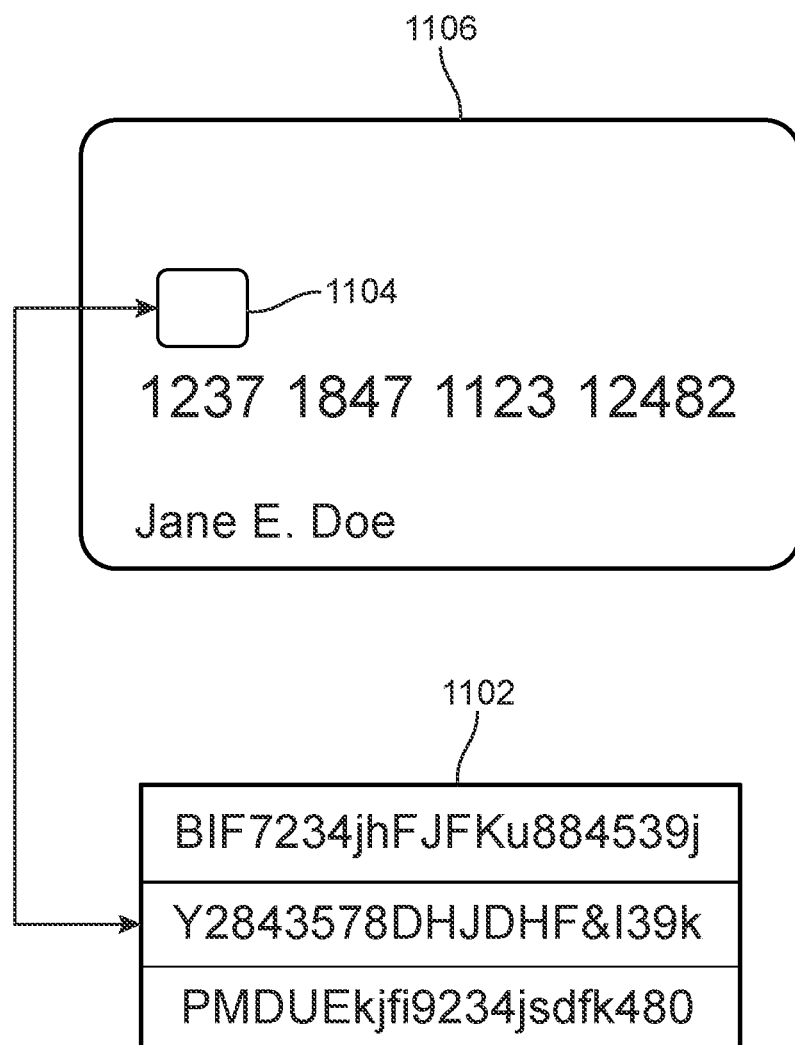
FIG. 11 is a schematic view of a configuration in which private keys are stored on a physical payment card, according to an embodiment.

Alternatively, in another embodiment, private keys could be stored directly on a customer's credit or debit card. In one embodiment, shown in FIG. 11, a set of private keys 1102 are stored in a memory device associated with a credit or debit card. Specifically, set of private keys 1102 are stored in memory associated with a microchip 1104 ("chip 1104") of credit card 1106. In some cases, the set of private keys could be stored on chip 1104 at the time credit card 1106 has been created. In other cases, the private keys could be transferred to chip 1104 after the card has been created. For example, in some cases, a banking institution can include a card read/write system 985, as seen in FIG. 9. Device 985 can be used to upload data to chip 1104. In other embodiments, a customer can have data (including private keys) uploaded to chip 1104 using an ATM or any suitable system capable of reading/writing to chips.

Using this exemplary configuration, when a customer swipes card 1106 at a point-of-sale system with a chip card reader, the point-of-sale system can retrieve one or more private keys from chip 1104 to facilitate transactions on a blockchain. In some cases, the addresses associated to each private key may also be stored on chip 1104. In other cases, however, a point-of-sale system may look-up the address associated to the private key (or to the customer) in a local database (such as database 925). Thus, in some cases, private keys may be stored on card 1106, which is maintained by the customer, while public keys (or addresses associated to them) may be stored in a database maintained by the merchant. The public and private keys can then be associated to one another based on the card number (for example, the number printed on card 1106). For example, the merchant side database may list one or more addresses for a given credit card number.

Referring back to FIG. 9, depending on the method of storing private keys, customer 902 could make purchases with a merchant using either card 910 or mobile device 912. In either case, during normal operation, the transaction associated with card 910 or mobile device 912 may be processed using processing system 960. However, if communication between point-of-sale system 920 and processing system 960 has been interrupted (for example, due to a catastrophic event), financial transaction processing can occur locally using local copy 942 of blockchain 940. Specifically, transactions can be made using private keys stored on card 910 and/or mobile device 912.

In an alternative embodiment, a local copy of the blockchain could be stored on a customer's mobile device. When a customer makes a purchase, the mobile device and merchant computing system could be networked using, for example, a WiFi connection, a Bluetooth connection, near field communications connection, or any other suitable connection. In such a configuration, the customer could implement the payment via their own local copy of the blockchain, rather than transmitting their private key to the merchant. In some cases, a payment management system running on the mobile device (such as payment management system 917) may be configured with logic to limit the ability of the customer to make payments based on various factors, including those described below and shown in FIGS. 17-18. Such a configuration may be useful for situations where it is assumed all customers can and will set up local nodes of the blockchain on their mobile device. In situations where maximum flexibility is preferred, the configuration shown in FIG. 9, where private keys are passed from the customer to the merchant may be used, since it does not require that customers have a local copy of the blockchain on their mobile device.

It may be appreciated that the exemplary set-up facilitates switching back and forth between processing financial transactions between a customer and a merchant using a digital payment processing system and a blockchain, depending on various conditions. The embodiments therefore enable a fault-tolerant method of processing digital payments, which is specifically tolerant of interruptions in communication networks.

Figure 10:
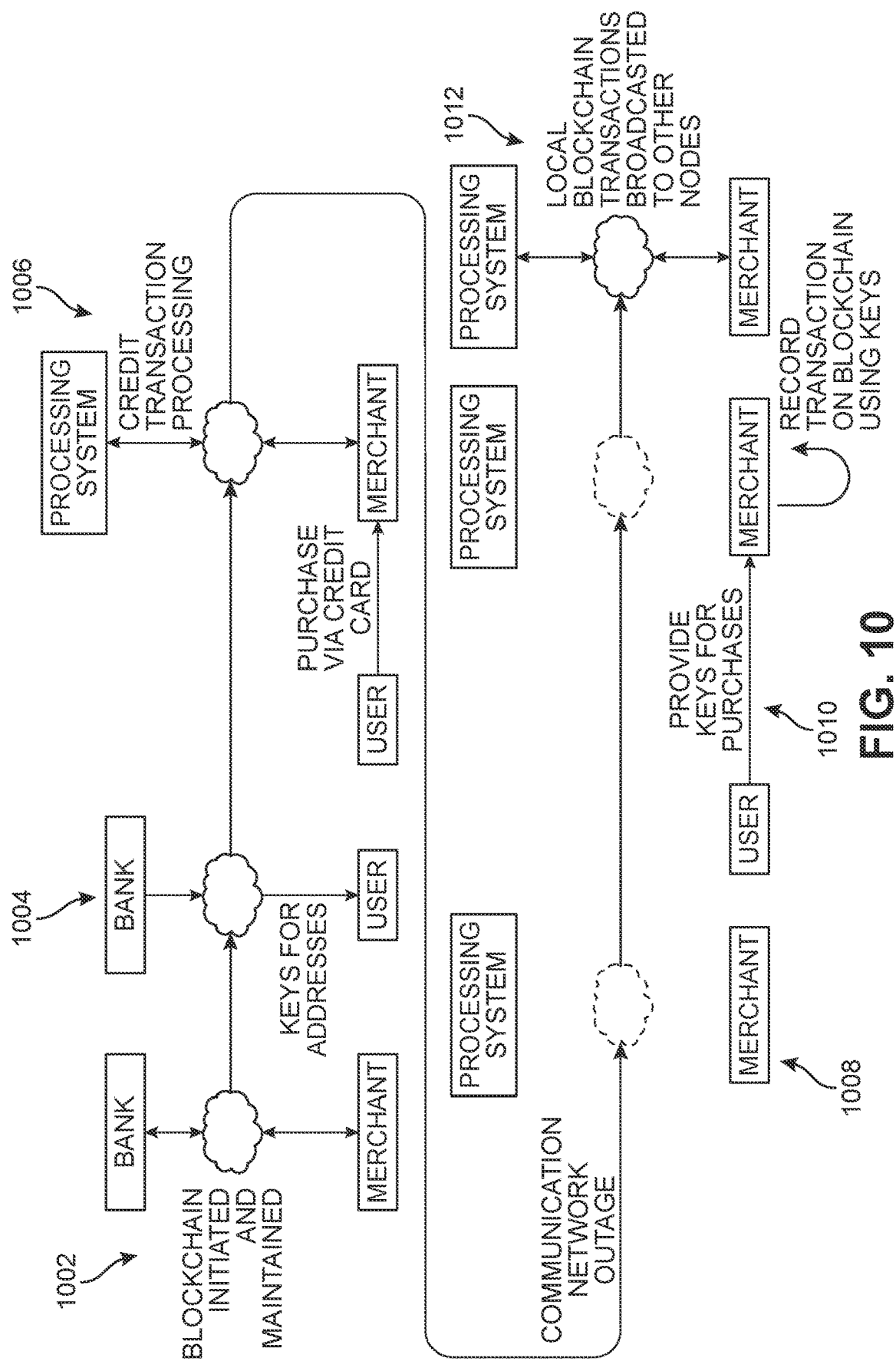
FIG. 10 is a schematic view of a sequence of events, according to another embodiment.

To clarify the operation of the exemplary system shown in FIG. 9, FIG. 10 shows a timeline of events for facilitating financial transactions between merchants and customers before, during, and after a catastrophic event where real-time communications with a financial institution have been interrupted.

As shown in FIG. 10, the blockchain may be initiated and maintained during a first event 1002. Specifically, both the bank and the merchant may download local copies of the blockchain and participate in the blockchain network prior to a catastrophe or other emergency, so that the local copies of the blockchain remain synchronized.

During a second event 1004, a bank distributes keys for addresses on the blockchain to a customer ("user" in FIG. 10). In some cases, the keys are private keys that provide access to funds associated with particular addresses on the blockchain. It may be appreciated that in some cases this step may occur "off chain." For example, in some cases information may be retrieved from a bank's databases (such as databases 982), including private keys, addresses, and other information, and securely sent to the customer over a communication network such as the Internet.

During a third event 1006, a customer makes a purchase with their credit (or debit) card. In this case, information retrieved by the point-of-sale system is sent to a digital payment processing system to be authorized, authenticated and recorded. In particular, it should be noted, that the processing of the financial transaction during event 1006 requires communication between the digital payment processing system and the merchant's point-of-sale system, which is facilitated by a communication network, such as the Internet.

Next, during a fourth event 1008, a communication network outage occurs. In some cases, such an outage could be the result of a catastrophe (such as a tornado, hurricane, wildfire, or other catastrophe) that damages parts of one or more communication networks. During this outage, there may be no way to process digital payments using a digital payment processing system. However, customers may still have an urgent need to make purchases (for example, buying food, water, and other emergency supplies) even while the network is down.

In a fifth event 1010, using the exemplary systems and methods, a customer is still able to transact with a merchant. Specifically, keys stored on either the customer's credit card or mobile device can be transmitted to the point-of-sale system. In some cases, information transmitted to the point-of-sale system could also include addresses (public keys) corresponding to each private key, as well as any other suitable information.

Once the private keys are transmitted to the merchant's computing systems, the computing systems record transactions on the blockchain using the key. Once the communication network is restored in step 1012, the transactions performed on the local blockchain can be broadcasted to other nodes of the blockchain so that the transactions can be reflected across all copies of the blockchain.

In some embodiments, it may be desirable to provide different allocations of emergency funds according to different customer characteristics. For example, it may be unwise to prefund addresses on the blockchain with large amounts of money if the customer has a low credit score. This may be relevant in cases where the prefunded addresses act as temporary loans to customers, as a low credit score indicates an unreliability in paying back loans or making regular payments on debts. In addition, even when the bank does not expect repayment of emergency funds provided on the blockchain, a low credit rating could indicate that a customer overspends, and so funds should be limited to ensure they purchase only absolute necessities. Similarly, a customer's account balance (such as checking account balance or savings account balance) may be considered in determining how much money to allocate to that customer in an emergency. Additionally, a customer's home address could be considered in determining how much money to allocate to the customer. In some cases, customers located outside of the geographic area where the emergency or catastrophe has occurred may be allocated less funds that customers located within the geographic area. For example, customers living outside of a city designated as a catastrophe area may be allocated sufficient funds to purchase gas and drive out of the city, while customers living in the city may be allocated sufficient funds to purchase groceries and other emergency supplies.

Figure 12:
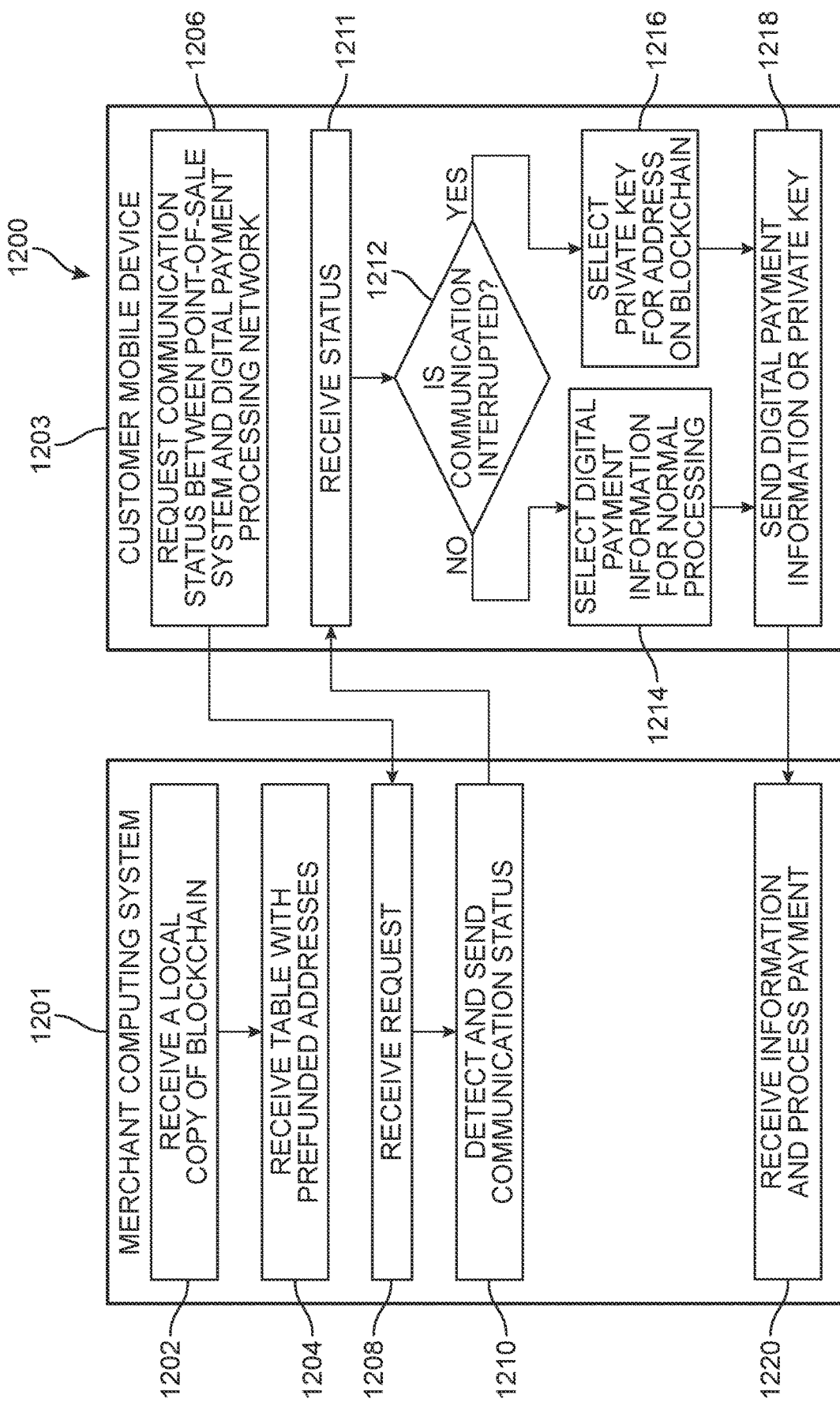
FIG. 12 is a schematic view of a computer implemented method of managing payments, according to an embodiment.

FIG. 12 is a schematic view of another method 1200 of enabling digital payments, according to an embodiment. In the exemplary configuration, some of the steps of method 1200 may be performed by a merchant computing system 1201, while other steps may be performed by a customer's mobile device 1203 (or any other suitable computing system operated by a customer).

Beginning in step 1202, computing system 1201 receives a local copy of a blockchain. In step 1204, computing system 1201 may receive a table with prefunded addresses. Generally, these steps may occur at any time prior to a communication interruption. In some cases, the blockchain and table could be received immediately after an emergency or catastrophe have been declared. In other cases, the blockchain and table could be received far in advance of any emergency or catastrophe.

At a later time, a customer operating mobile device 1203 may attempt to make a payment with a point-of-sale system operated by the merchant. At this time, mobile device 1203 may request the communication status between the point-of-sale system and an associated digital payment processing system that is normally used to process digital payments. This request is received by computing system 1201 in step 1208. The communication status is detected and then sent in step 1210 and received by mobile device 1203 in step 1211.

In step 1212, mobile device 1203 checks the received status and determines if there is a communication interruption. If not, the system selects digital payment information to be sent to the point-of-sale system in step 1214. If there is an interruption, the system selects a private key for an associated address on the blockchain in step 1216. In step 1218, the selected information (either digital payment information or private key) is sent to computing system 1201. This information is received in step 1220 by computing system 1201 and used to process the payment from the customer to the merchant.

Figure 13:
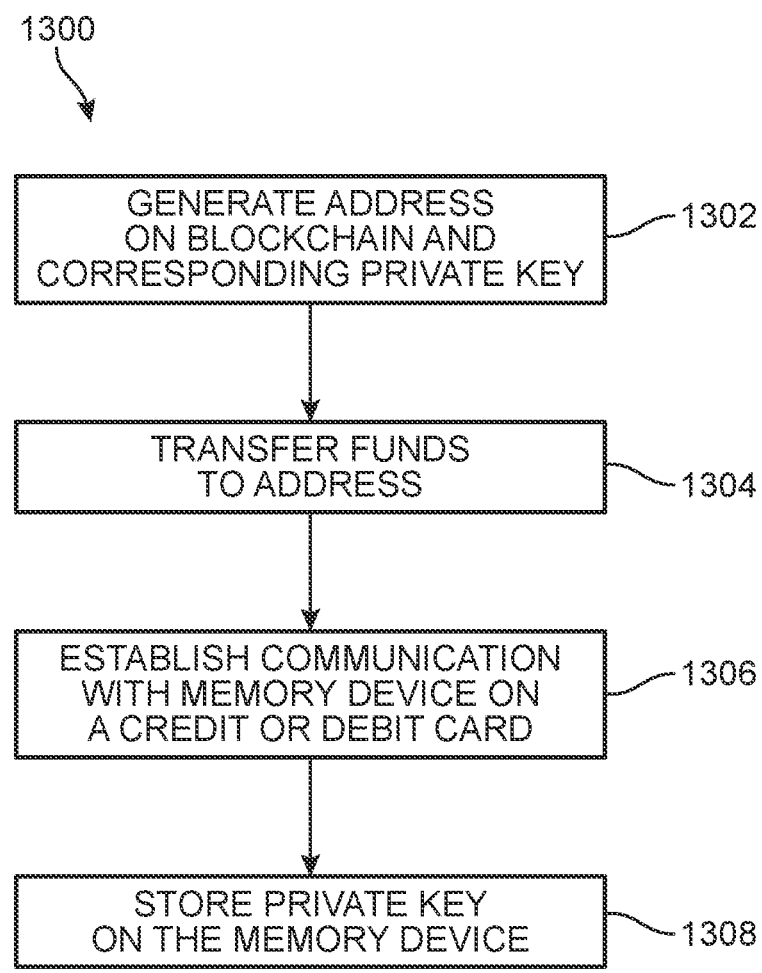
FIG. 13 is a schematic view of a method of generating and storing private keys on the memory device of a physical payment card.

FIG. 13 is a schematic view of a method 1300 for enabling credit or debit cards with private keys to facilitate blockchain transactions, according to an embodiment. The exemplary method can be performed by any suitable computing system that can write data to the memory of a chip on a card. In step 1302, the computing system may generate an address on a blockchain along with a corresponding private key. Next, in step 1304, the computing system may transfer funds to the address generated in step 1302.

In step 1306, the computing system may establish communication with a memory device on a credit or debit card. In some cases, this communication could be established via a machine that can read and write to chips on cards. In step 1308, the computing system stores the generated private key on the memory device. Of course, it may be appreciated, that this process could be performed for multiple addresses and private keys so that multiple private keys could be stored on the device. In some cases, the system may also store the blockchain addresses (or public keys) associated with the private keys.

Figure 14:
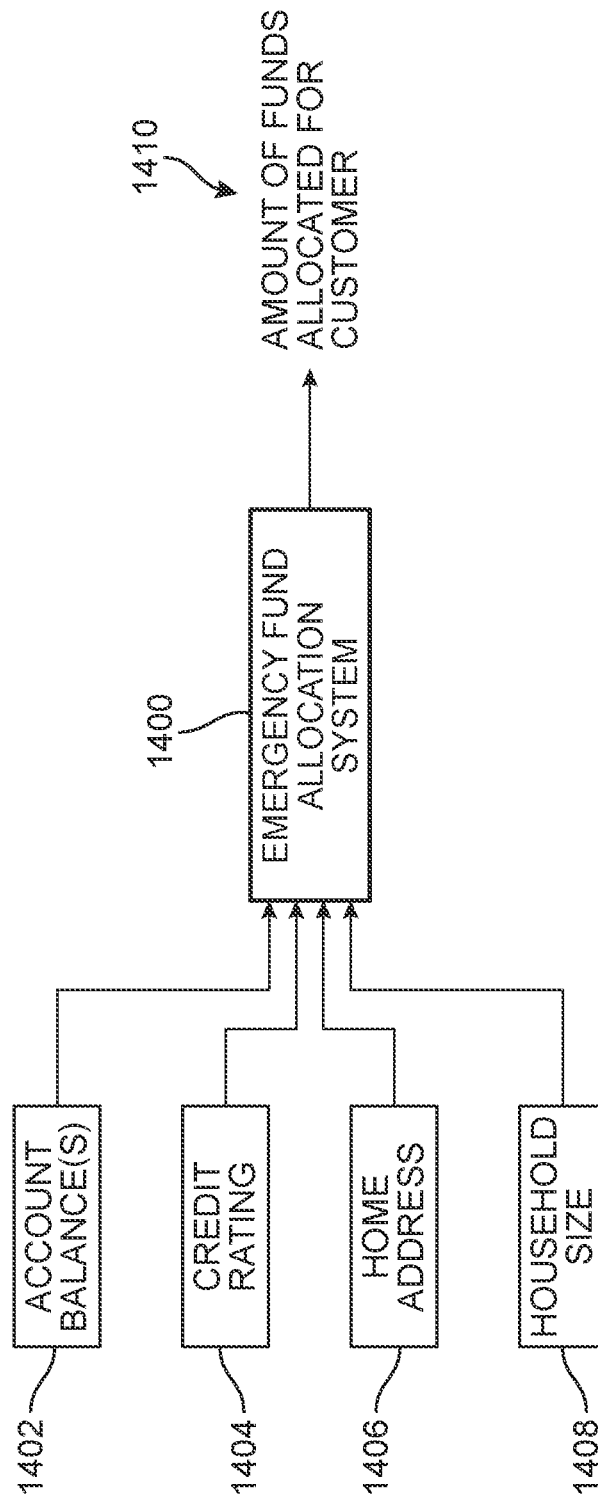
FIG. 14 is a schematic view of inputs and outputs of an emergency fund allocation system, according to an embodiment.

FIG. 14 is a schematic view of inputs and outputs to an emergency fund allocation system 1400 ("system 1400"), which could be used by a bank or other financial institution to allocate an appropriate amount of funds to addresses on the blockchain associated to a banking customer. As seen in FIG. 12, exemplary inputs can include account balance(s) 1402, credit rating 1404, home address 1406, and household size 1408. Based on these inputs, system 1400 can determine an amount of funds to be allocated to a blockchain address associated with the customer (output 1410). Using a fund allocation system can help mitigate risk for the banking institution providing the emergency funds and may also minimize the potential for fraudulent or undesirable financial activity on the blockchain.

As one example, the amount of allocated funds may increase with a customer's account balance, credit rating, and household size. In addition, the amount of allocated funds may increase according to the proximity of the customer's home address to the geographic region experiencing the emergency/catastrophe. Specifically, customers located closer to the designated geographic region may be allocated more funds than customers located further from the designated geographic region.

Emergency fund allocation system can comprise any suitable machine learning models or algorithms for calculating an allocation amount based on a set of input parameters. In some cases, a linear model could be used in which each input is weighted and a sum of the weighted inputs provides the output allocation amount. In other cases, non-linear models, including neural networks, could be used to predict appropriate allocation amounts based on input parameters.

In order to minimize the risk for fraudulent use of emergency funds by customers of a banking institution or other parties, the embodiments can include various triggers that limit when and how emergency funds can be created and/or used. In some embodiments, a system can automatically distribute and control the use of emergency funds via smart contracts that are enabled on the blockchain. As used herein, the term "smart contract" refers to any self-executing program that runs on a blockchain and is written in code within the blockchain. Smart contracts can be used to facilitate trusted transactions and agreements between two or more parties.

To receive information external to the blockchain (so-called "off-chain" data") that can act as triggers for distributing funds on the blockchain, the embodiments may include an oracle. An oracle is any system that queries, verifies, and authenticates external data sources, so that external data can be injected into the blockchain. The injected information can then be used by a smart contract and/or to initiate the execution of a smart contract via a trigger.

Figure 15:
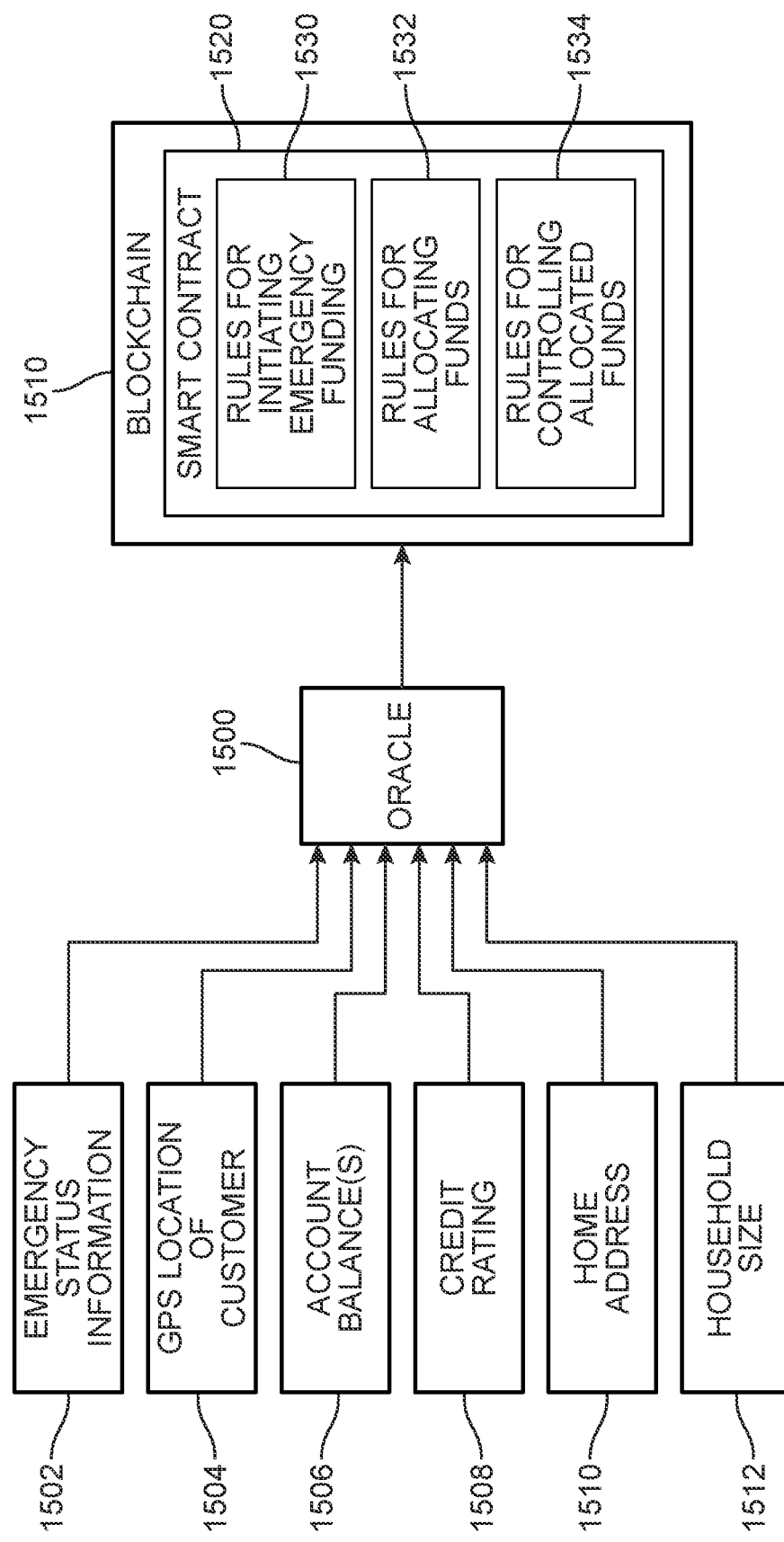
FIG. 15 is a schematic view of an oracle that interfaces with a smart contract on a blockchain, according to an embodiment.

FIG. 15 is a schematic view of an oracle 1500 that can be used to deliver off blockchain information to smart contracts that reside on the blockchain. In this case, oracle 1500 receives multiple inputs. These include emergency status information (input 1502). Emergency status information includes information about the beginning, end and/or intermittent status of a catastrophe. Such information may further include the type of emergency (or catastrophe), as well as the geographic region(s) or area(s) affected by the emergency. In some embodiments, emergency status information can be retrieved from an emergency alert system that generates messages about pending and/or ongoing emergencies/catastrophes. In other embodiments, emergency status information can be retrieved from any other suitable source.

Oracle 1500 may also receive the GPS location of a customer (input 1504). This can be provided, for example, by requesting the location of the customer's phone. In some cases, this information could be requested only at the beginning of the emergency (or in some suitable period before or after the emergency begins). In other cases, the location of the customer could be continuously retrieved throughout the duration of the emergency. In some cases, the location of the customer can be inferred from the location of the point-of-sale system, which may be retrievable by oracle 1500.

In some embodiments, oracle 1500 may also have inputs that may be used by a smart contract to determine an amount of funds to allocate to each customer. Such inputs could include, but are not limited to: account balances (input 1506), credit rating (input 1508), home address (input 1510), and household size (input 1512) which have been previously discussed.

These various inputs are delivered by oracle 1500 to one or more smart contracts residing on blockchain 1510. As an example, a smart contract 1520 resides on blockchain 1510. Smart contract 1520 comprises various rulesets that are implemented based on one or more triggers. These include rules for initiating emergency funding (1530), rules for allocating funds (rules 1532) and rules for controlling allocated funds (rules 1534). Rules for initiating emergency funding 1530 may use emergency status information 1502 to determine if there is a pending and/or ongoing emergency. If there is no pending and/or ongoing emergency, there is no need to make emergency funds available. Once an emergency is identified, the system can trigger rules for allocating funds 1532. In some cases, rules for allocating funds can be similar to those described above using emergency fund allocation system 1400 of FIG. 14. Rules for controlling allocated funds can help provide safeguards against unwarranted use of emergency funds, as described in further detail below.

Figure 16:
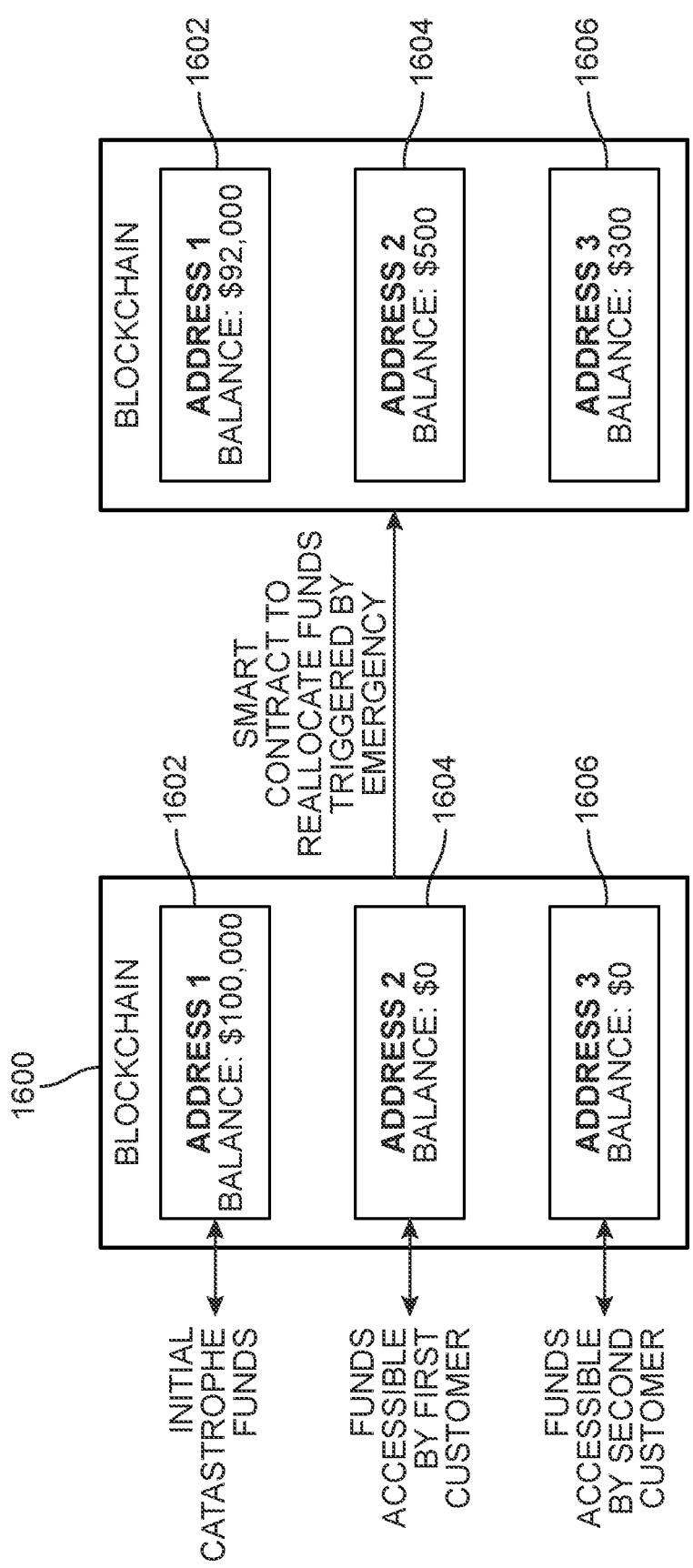
FIG. 16 is a schematic view of a smart contract reallocating funds in response to a trigger, according to an embodiment.

FIG. 16 is a schematic view showing how a smart contract may automatically distribute emergency funds to various addresses on a blockchain 1600 in response to a trigger. In this case, an oracle may receive a message that a catastrophe has occurred in a particular geographic area (or region). Based on this trigger, the smart contract may automatically reallocate funds from a first address 1602 to a second address 1604 and to a third address 1606. In this case, first address 1602 may be an address that is designated (and controlled) by a banking institution with the specific purpose of providing emergency funds during a catastrophe or other emergency. Second address 1604 and third address 1606 may be accessible by a first customer and a second customer, respectively, who have access to private keys for those addresses. As seen in FIG. 16, prior to the trigger, the first customer and the second customer cannot make any purchases using the blockchain, since their associated addresses have zero balance. After the trigger, the funds are reallocated so that each customer can access funds on the blockchain for emergency purchases even when communication with digital payment processing systems are interrupted.

Figure 17:
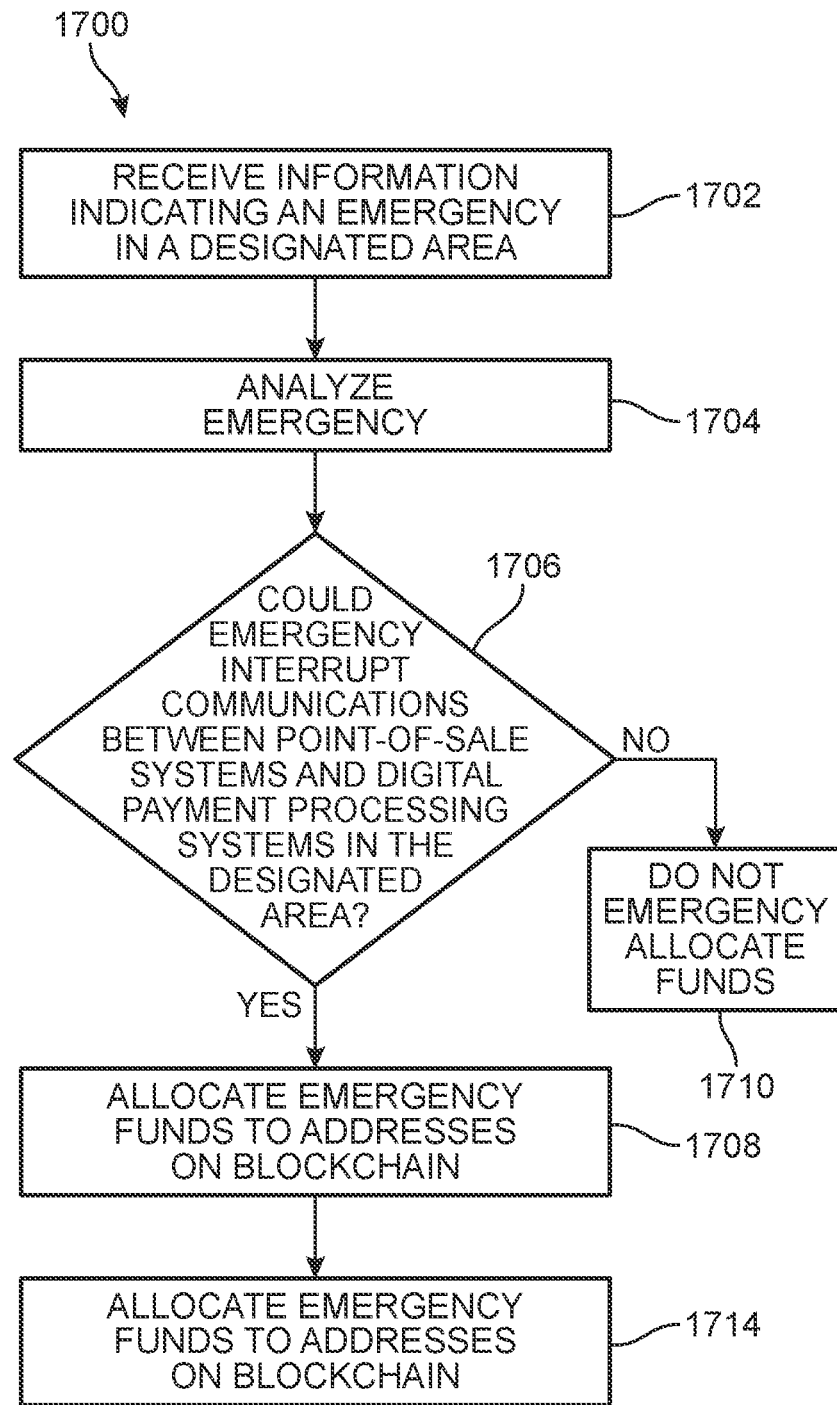
FIG. 17 is a schematic view of a method of allocating emergency funds in response to a triggering event, according to an embodiment.

FIG. 17 is a schematic view of a method 1700 of allocating emergency funds to addresses on a blockchain in response to a trigger, according to an embodiment. In some embodiments, some of the following steps could be performed by a smart contract on a blockchain. In other embodiments, some of the following steps could be performed by a computing system associated with a banking institution, merchant, or customer.

In step 1702, the system receives information indicating that an emergency has occurred in a designated area. As used herein, the term designated area may refer to any geographic area, including areas determined by state, county, or city boundaries, zip code areas, or other suitable areas. In step 1704, the system analyzes the emergency. In particular, the system may determine if the type of emergency is commonly associated with communication interruptions, such as interruptions to cellular networks, internet service provider nodes, or other relevant systems. In some cases, the system could include a classifier that determines if a particular emergency is likely to cause an interruption or not.

In step 1706, the system determines if the emergency may interrupt communications between point-of-sale systems and digital payment processing systems in the designated area based on the analysis performed in step 1704. If so, the system may allocate emergency funds to the addresses in step 1708. Otherwise, the system does not allocate emergency funds in step 1710.

Some embodiments may include an optional step 1714, in which the system periodically reallocates emergency funds. In particular, to reduce the chances that emergency funds would be used fraudulently after the emergency has subsided, the system can periodically remove funds from the accounts that were previously funded. Over time, the available funds may be reduced until the balance is zero. In some cases, the reallocation of funds can be accomplished by a banking institution, which may have a copy of the private key for each address with emergency funds. In other cases, reallocation can be initiated by one or more smart contracts on the blockchain.

Figure 18:
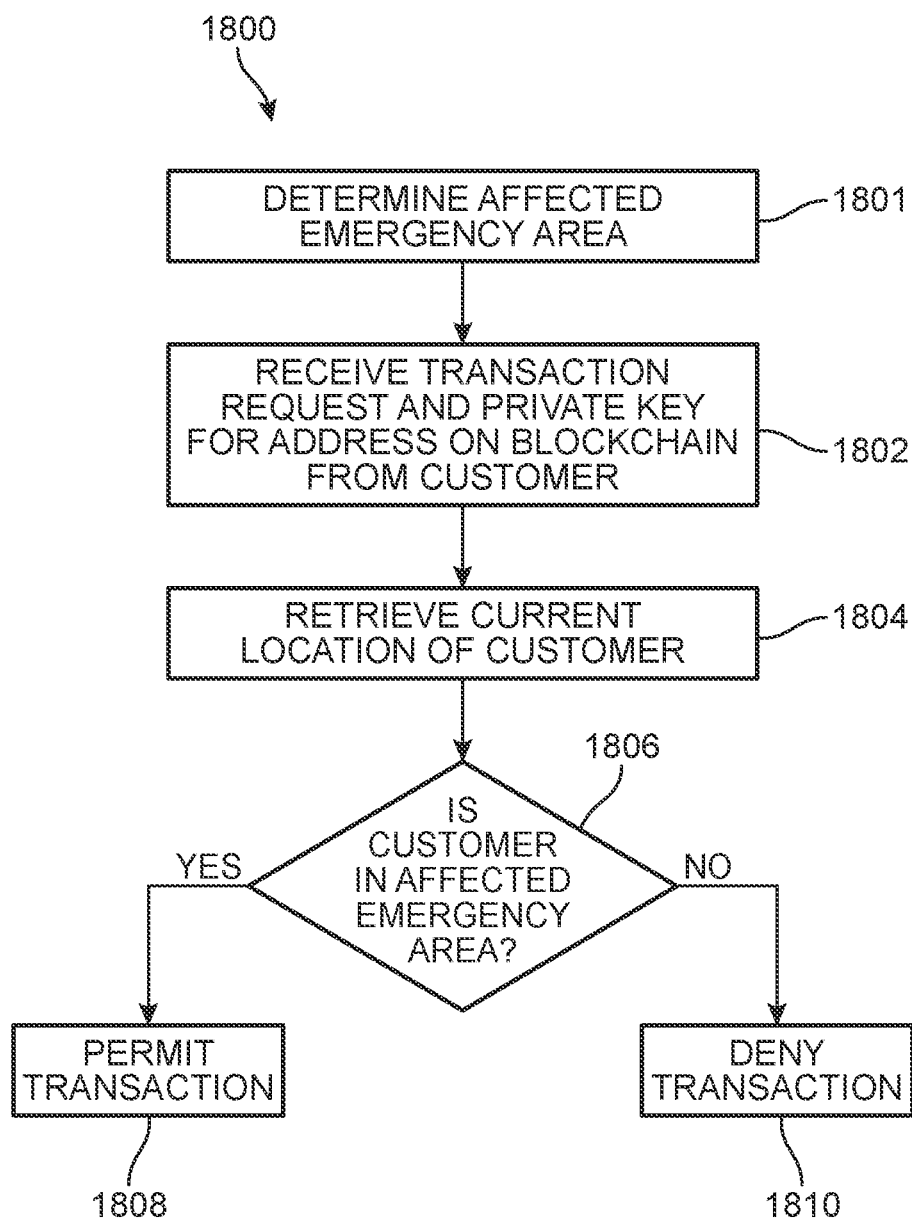
FIG. 18 is a schematic view of a method of controlling a transaction based on location, according to an embodiment.

FIG. 18 is a schematic view of a method 1800 for permitting or denying transactions on a blockchain based on geofencing. In some embodiments, some of the following steps could be performed by a smart contract on a blockchain. In other embodiments, some of the following steps could be performed by a computing system associated with a banking institution or merchant.

Starting in step 1801, the system may determine any affected emergency areas. In some cases, this information may be received from an emergency alert system.

In step 1802, the system may receive a transaction request and a private key for an address on a blockchain from a customer. More specifically, this information may be received from a point-of-sale system, which has retrieved this information from a credit/debit card, mobile device, or other suitable digital payment system.

In step 1804, the system determines the current location of the customer. The location can be determined either from a location associated with a point-of-sale system interfacing with the customer's card or device, or directly from the customer's device. For example, a GPS location from a customer's mobile device could be transmitted, via the point-of-sale system, to any system performing one or more steps of method FIG. 1800.

In step 1806, the system determines if the customer is in the affected emergency area based on information from step 1801 (the affected emergency area) and from step 1804 (the customer's location).

If the customer is in the affected area, the system may permit the transaction in step 1808. Otherwise, if it is determined that the customer is outside of the affected area, the system may deny the transaction in step 1810.

It may be appreciated that steps of permitting transactions (step 1808) or denying transactions (step 1810) could be implemented using merchant-side software or smart contracts. In one embodiment, for example, merchant-side software running on a merchant's computing system(s) may only initiate payments on the blockchain if the user is located in the designated emergency area. In another embodiment, smart contracts on the blockchain may include instructions to only initiate transactions when the user is located in the designated emergency area.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, python, java, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/ or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer implemented method for enabling digital transactions when communication between a point-of-sale system and a digital payment processing system is unavailable, the method comprising the steps of:
    retrieving, at a computing system in communication with the point-of-sale system, a copy of a blockchain by downloading the copy of the blockchain from a communications network and storing the copy of the blockchain in memory of the computing system;
    receiving, at the computing system, downloaded data including a set of digital account identifiers, a set of blockchain addresses residing on the blockchain, and a set of private keys, and storing the set of digital account identifiers, the set of blockchain addresses residing on the blockchain, and the set of private keys in a database of the computing system;
    receiving transaction data from the point-of-sale system, the transaction data including a digital account identifier;
    sending a message to the digital payment processing system using the computing system, and determining, upon failing to receive a response from the digital payment processing system, that communication between the point-of-sale system and the digital payment processing system is unavailable;
    retrieving from the database of the computing system, in response to detecting that communication between the point-of-sale system and the digital payment processing system is unavailable, a blockchain address associated with the digital account identifier and a private key corresponding to the blockchain address; and
    using the private key to perform a transaction between the retrieved blockchain address and another blockchain address on the copy of the blockchain stored in memory on the computing system.

2. The computer implemented method of claim 1, wherein the method further includes:
    detecting that communication between the point-of-sale system and the digital payment processing system is available;
    receiving additional transaction data from the point-of-sale system; and
    sending the transaction data to the digital payment processing system.

3. The computer implemented method of claim 1, wherein each digital account identifier is associated with at least one blockchain address, and wherein the set of blockchain addresses are in one-to-one correspondence with the set of private keys.

4. The computer implemented method of claim 1, wherein the method further includes receiving an emergency alert.

5. The computer implemented method of claim 1, wherein the method further includes receiving information indicating an emergency in a designated area.

6. The computer implemented method of claim 5, wherein the method further includes allocating emergency funds to the blockchain address in response to receiving information indicating the emergency in the designated area.

7. The computer implemented method of claim 5, wherein the transaction data includes a location, and wherein the method further includes checking that the location is within the designated area before performing the transaction.

8. A computing system for enabling digital transactions when communication between a point-of-sale system and a digital payment processing system is unavailable, the computing system being in communication with the point-of-sale system, the computing system comprising:
    a processor configured to:
    retrieve a copy of a blockchain by downloading the copy of the blockchain from a communications network and storing the copy of the blockchain in memory of the computing system;
    receive downloaded data including a set of digital account identifiers, a set of blockchain addresses residing on the blockchain, and a set of private keys, and storing the set of digital account identifiers, the set of blockchain addresses residing on the blockchain, and the set of private keys in a database of the computing system;
    receive transaction data from the point-of-sale system, the transaction data including a digital account identifier;
    send a message to the digital payment processing system and determine, upon failing to receive a response from the digital payment processing system, that communication between the point-of-sale system and the digital payment processing system is unavailable;
    retrieve from the database of the computing system, in response to detecting that communication between the point-of-sale system and the digital payment processing system is unavailable, a blockchain address associated with the digital account identifier and a private key corresponding to the blockchain address; and
    use the private key to perform a transaction between the retrieved blockchain address and another blockchain address on the copy of the blockchain stored in memory on the computing system.

9. The computing system according to claim 8, wherein each digital account identifier is associated with at least one blockchain address, and wherein the set of blockchain addresses are in one-to-one correspondence with the set of private keys.

10. The computing system according to claim 8, wherein the processor is further configured to:

detect that communication between the point-of-sale system and the digital payment processing system is available;
receive additional transaction data from the point-of-sale system; and
send the transaction data to the digital payment processing system.

* * * * *